US011215722B2

(12) United States Patent
Le Calvez et al.

(10) Patent No.: US 11,215,722 B2
(45) Date of Patent: Jan. 4, 2022

(54) JOINT SENSOR ORIENTATION AND VELOCITY MODEL CALIBRATION

(71) Applicant: Schlumberger Technology Corporation, Sugar Land, TX (US)

(72) Inventors: Joel Herve Le Calvez, Richmond, TX (US); Takashi Mizuno, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/855,925

(22) Filed: Apr. 22, 2020

(65) Prior Publication Data
US 2020/0341159 A1 Oct. 29, 2020

(51) Int. Cl.
*G01V 1/28* (2006.01)
*G01V 1/30* (2006.01)
*G01V 1/52* (2006.01)

(52) U.S. Cl.
CPC .............. *G01V 1/288* (2013.01); *G01V 1/282* (2013.01); *G01V 1/303* (2013.01); *G01V 1/52* (2013.01); *G01V 2210/1234* (2013.01); *G01V 2210/1299* (2013.01); *G01V 2210/50* (2013.01); *G01V 2210/646* (2013.01); *G01V 2210/70* (2013.01)

(58) Field of Classification Search
None
See application file for complete search history.

(56) References Cited

U.S. PATENT DOCUMENTS

| 7,660,199 B2 | 2/2010 | Drew |
| 9,945,970 B1 | 4/2018 | Abel et al. |
| 2013/0079935 A1* | 3/2013 | Kabannik ................ G01V 1/40 |
| | | 700/282 |
| 2016/0033666 A1 | 2/2016 | Hirabayashi |
| 2017/0329029 A1 | 11/2017 | Dykstra et al. |
| 2018/0095184 A1 | 4/2018 | Hogarth et al. |

OTHER PUBLICATIONS

Will et al., "Microseismic data acquisition, processing, and event characterization at the Illinois Basin—Decatur Project" International Journal of Greenhouse Gas Control 54 (2016) 404-420 (Year: 2016).*
Menanno et al., "Borehole receiver orientation using a 3D velocity model" Geophysical Prospecting, 2013 (Year: 2013).*
Armstrong, "Model-Based Relative Bearing Estimation for a Downhole Multicomponent Sensor Array" SEG Houston 2009 International Exposition and Annual Meeting (Year: 2009).*
Warpinski et al., "Improved Microseismic Fracture Mapping Using Perforation Timing Measurements for Velocity Calibration" Mar. 2005 SPE Journal (Year: 2005).*

(Continued)

*Primary Examiner* — John C Kuan
(74) *Attorney, Agent, or Firm* — Trevor G. Grove

(57) ABSTRACT

A method can include receiving microseismic data of microseismic events as acquired by sensors during hydraulic fracturing of a geologic region; jointly calibrating sensor orientation of the sensors and a velocity model of the geologic region via an objective function and the microseismic data; and, based at least in part on the jointly calibrating, determining one or more locations of the one or more microseismic events.

14 Claims, 11 Drawing Sheets

(56) References Cited

OTHER PUBLICATIONS

Bulant, et al., "Borehole deviation surveys are necessary for hydraulic fracture monitoring," Society of Petroleum Engineers Annual Technical Conference and Exhibition, Sep. 24-27, 2006, San Antonio.
Drew, et al., "Automated microseismic event detection and location by continuous spatial mapping," SPE Annual Technical Conference and Exhibition, 95513. 1-7, 2005.
Ekstrom, et al., "Measurements of seismometer orientation at USAraay transportable array and backbone stations," Seismological Research Letters, vol. 79, No. 4, pp. 554-561, 2008.
Le Calvez, et al., "Monitoring microseismic fracture development to optimize stimulation and production in aging fields," The Leading Edge, v. 24, n. 1, p. 72-75. 2005.
Le Calvez, et al., "Tool orientation and velocity model calibration for downhole-based hydraulic fracture monitoring of induced microseismicity," Society of Exploration Geophysicists Annual Meeting, 2013.
Mizuno, et al., "Anisotropic velocity model calibration for imaging the microseismic cloud,". 72nd EAGE Conference & Exhibition SPE EUROPEC 2010, Barcelona, Spain, Jun. 14-17, 2010.
Thomsen, "Weak elastic anisotropy", Geophysics, vol. 51, No. 10, pp. 1954-1966, Oct. 1986.
International Preliminary Report of Patentability of PCT Application PCT/US2019/029050, dated Nov. 4, 2021 (8 pages).
International Search Report and Written Opinion of PCT Application PCT/US2019/029050, dated Jan. 17, 2020 (11 pages).
Drew, et al., "Challenges in acoustic emission detection and analysis for hydraulic fracture monitoring," International Acoustic Emission Symposium, 17th Proceedings, p. 15-22, 2004.

\* cited by examiner

JOINT SENSOR ORIENTATION AND VELOCITY MODEL CALIBRATION

CROSS REFERENCE TO RELATED APPLICATIONS

This application claims the benefit of priority to International Patent Application PCT/US2019/029050, filed on Apr. 25, 2019, the entire content of which is incorporated herein by reference.

BACKGROUND

Seismology finds use in geophysics, for example, to estimate properties of subsurface formations. As an example, seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks.

SUMMARY

A method can include receiving microseismic data of microseismic events as acquired by sensors during hydraulic fracturing of a geologic region; jointly calibrating sensor orientation of the sensors and a velocity model of the geologic region via an objective function and the microseismic data; and, based at least in part on the jointly calibrating, determining one or more locations of the one or more microseismic events. A system can include a processor; memory accessible by the processor; processor-executable instructions stored in the memory that include instructions to instruct the system to: receive microseismic data of microseismic events as acquired by sensors during hydraulic fracturing of a geologic region; jointly calibrate sensor orientation of the sensors and a velocity model of the geologic region via an objective function and the microseismic data; and, based at least in part on the jointly calibration, determine one or more locations of the one or more microseismic events. One or more computer-readable storage media can include computer-executable instructions to instruct a system to: receive microseismic data of microseismic events as acquired by sensors during hydraulic fracturing of a geologic region; jointly calibrate sensor orientation of the sensors and a velocity model of the geologic region via an objective function and the microseismic data; and based at least in part on the jointly calibration, determine one or more locations of the one or more microseismic events. Various other methods, systems, etc. are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
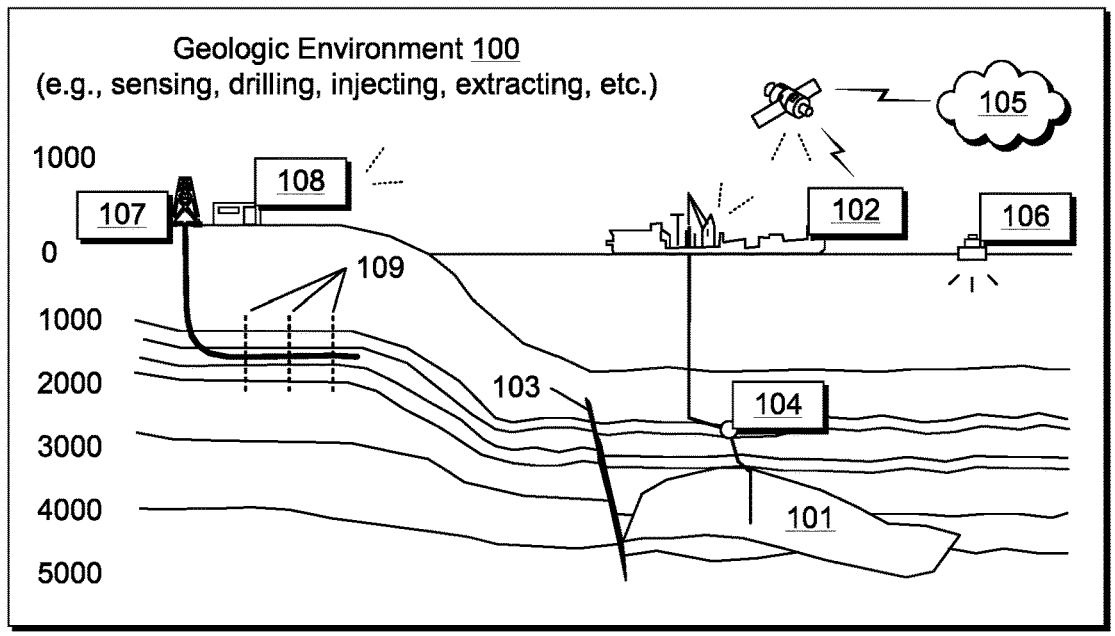
FIG. 1 illustrates an example of a geologic environment and an example of a technique.
Figure 1:
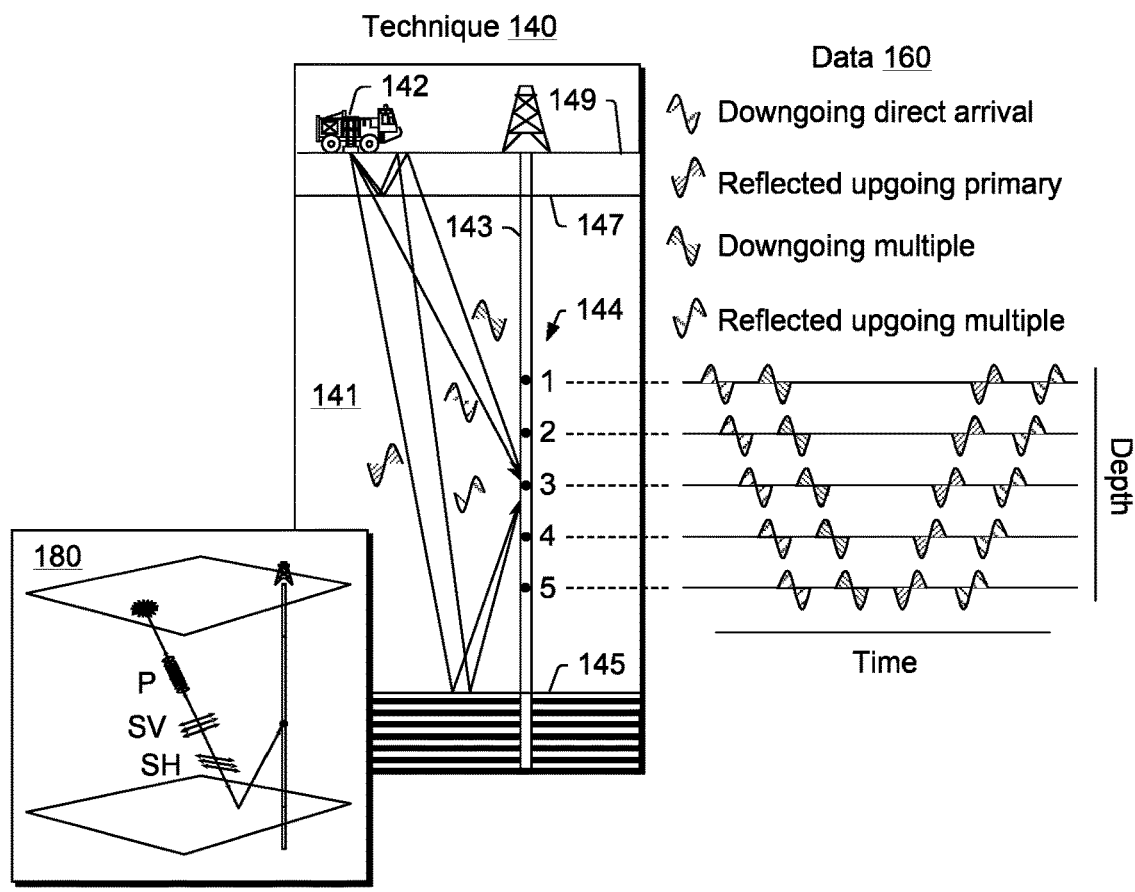

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, seismology finds use in geophysics, for example, to estimate properties of subsurface formations. As an example, seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks. Seismology can be part of an imaging workflow that can generate an image of a subsurface region. As an example, an image may be based on amplitude data as in seismic traces of amplitude versus time as acquired during a seismic survey. As an example, an image may be based on processed seismic traces where such processing may output one or more types of seismic attributes that are values based on seismic trace data.

As an example, seismology can be utilized during an operation that fractures rock in a subsurface region where a fracture can generate one or more microseismic events. A seismic survey system can sense seismic energy of microseismic events, optionally by a plurality of sensors, and generate digital data that may be analyzed to determine a location for one or more of the microseismic events where the location can be a location of a fracture that generated the seismic energy.

Microseismic monitoring is a technique that can be utilized to track propagation of a fracture (e.g., a hydraulic fracture) as it advances through a formation. For example, microseisms can be detected, located, and rendered to a display, optionally in time for one or more operators to approximate the location and propagation of the hydraulic fracture as it is being generated. As an example, a system can include one or more processors and one or more displays operatively coupled thereto where imagery can be generated using microseismic data (e.g., microseisms). For example, imagery can be rendered in a 3D spatial coordinate system with reference to location(s) of a fracturing treatment. As an example, monitored activities may be animated to show progressive fracture growth and/or to show subsurface response to pumping variations by hydraulic pumping equipment. When displayed in real time, microseismic activity can allow an operator to make one or more changes to a stimulation plan, a stimulation operation, etc., to help ensure appropriate reservoir contact. Microseismic data may also provide information concerning effectiveness of a stimulation treatment of a reservoir, for example, as may be utilized to enhance reservoir development in shale gas completions or other completions. As an example, a microseismic data processing system can be part of or operatively coupled to a controller that can be operatively coupled to one or more pieces of equipment that may be utilized to deliver a stimulation treatment, to acquire microseismic data, to drill into a formation, etc. For example, a system may generate a location of a fracture and issue an instruction to a piece of equipment based at least in part on the location of the fracture. In such an example, the generated location may be an improved location as achieved via one or more methods. Such an approach can improve a stimulation treatment and, for example, improve production of fluid from a stimulated reservoir.

FIG. 1 shows an example of a geologic environment 100 (e.g., an environment that includes a sedimentary basin, a reservoir 101, a fault 103, one or more fractures 109, etc.) and an example of an acquisition technique 140 to acquire seismic data. As an example, a system may process data acquired by the technique 140, for example, to allow for direct or indirect management of sensing, drilling, injecting, extracting, etc., with respect to the geologic environment 100. In turn, further information about the geologic environment 100 may become available as feedback (e.g., optionally as input to the system). As an example, an operation may pertain to a reservoir that exists in the geologic environment 100 such as, for example, the reservoir 101. As an example, a technique may provide information (e.g., as an output) that may specifies one or more location coordinate of a feature in a geologic environment, one or more characteristics of a feature in a geologic environment, etc.

As an example, a system may include features of a simulation framework such as the PETREL seismic to simulation software framework (Schlumberger Limited, Houston, Tex.). The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment, decision making, operational control, etc.).

As an example, a system may include add-ons or plug-ins that operate according to specifications of a framework environment. For example, a framework environment marketed as the OCEAN framework environment (Schlumberger Limited, Houston, Tex.) allows for integration of add-ons (or plug-ins) into a PETREL framework workflow. The OCEAN framework environment leverages .NET tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework may be implemented within or in a manner operatively coupled to the DELFI cognitive exploration and production (E&P) environment (Schlumberger Limited, Houston, Tex.), which is a secure, cognitive, cloud-based collaborative environment that integrates data and workflows with digital technologies, such as artificial intelligence and machine learning. As an example, such an environment can provide for operations that involve one or more computational frameworks. For example, various types of computational frameworks may be utilized within an environment such as a drilling plan framework, a seismic-to-simulation framework (e.g., PETREL framework, Schlumberger Limited, Houston, Tex.), a measurements framework (e.g., TECH LOG framework, Schlumberger Limited, Houston, Tex.), a mechanical earth modeling (MEM) framework (PETROMOD framework, Schlumberger Limited, Houston, Tex.), an exploration risk, resource, and value assessment framework (e.g., GEOX, Schlumberger Limited, Houston, Tex.), a reservoir simulation framework (INTERSECT, Schlumberger Limited, Houston, Tex.), a surface facilities framework (e.g., PIPESIM, Schlumberger Limited, Houston, Tex.), a stimulation framework (MANGROVE framework, Schlumberger Limited, Houston, Tex.). As an example, one or more methods may be implemented at least in part via a framework (e.g., a computational framework) and/or an environment (e.g., a computational environment).

In the example of FIG. 1, the geologic environment 100 may include layers (e.g., stratification) that include the reservoir 101 and that may be intersected by a fault 103 (see also, e.g., the one or more fractures 109, which may intersect a reservoir). As an example, a geologic environment may be or include an offshore geologic environment, a seabed geologic environment, an ocean bed geologic environment, etc.

As an example, the geologic environment 100 may be outfitted with any of a variety of sensors, detectors, actuators, etc. For example, equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 105 that may be configured for communications, noting that the satellite may additionally or alternatively include circuitry for imagery (e.g., spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 107 and/or 108 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL software, for example, that operates on seismic data, seismic attribute(s), etc. As an example, a workflow may be a process implementable in the OCEAN framework. As an example, a workflow may be a process implementable in the DELFI framework. As an example, a workflow may include one or more worksteps that access a module such as a plug-in (e.g., external executable code, etc.). As an example, a workflow may include rendering information to a display (e.g., a display device). As an example, a workflow may include receiving instructions to interact with rendered information, for example, to process information and optionally render processed information. As an example, a workflow may include transmitting information that may control, adjust, initiate, etc. one or more operations of equipment associated with a geologic environment (e.g., in the environment, above the environment, etc.).

In FIG. 1, the technique 140 may be implemented with respect to a geologic environment 141. As shown, an energy source (e.g., a transmitter) 142 may emit energy where the energy travels as waves that interact with the geologic environment 141. As an example, the geologic environment 141 may include a bore 143 where one or more sensors (e.g., receivers) 144 may be positioned in the bore 143. As an example, energy emitted by the energy source 142 may interact with a layer (e.g., a structure, an interface, etc.) 145 in the geologic environment 141 such that a portion of the energy is reflected, which may then be sensed by one or more of the sensors 144. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 141 is shown as including a layer 147 that resides below a surface layer 149. Given such an environment and arrangement of the source 142 and the one or more sensors 144, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces (see also, e.g., FIG. 2), evidence of a multiple from a water interface (e.g., an interface of a base of water and rock or sediment beneath it) or evidence of a multiple from an air-water interface, etc.

As shown in FIG. 1, acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves 180 as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\epsilon$, $\delta$ and $\gamma$. The Thomsen parameter $\delta$ describes depth mismatch between logs (e.g., actual depth) and seismic depth. As to the Thomsen parameter $\epsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\epsilon$ and $\gamma$ may be estimated from wave data while estimation of the Thomsen parameter $\delta$ may involve access to additional information.

As an example, seismic data may be acquired for a region in the form of traces. In the example of FIG. 1, the technique 140 may include the source 142 for emitting energy where portions of such energy (e.g., directly and/or reflected) may be received via the one or more sensors 144. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 2:
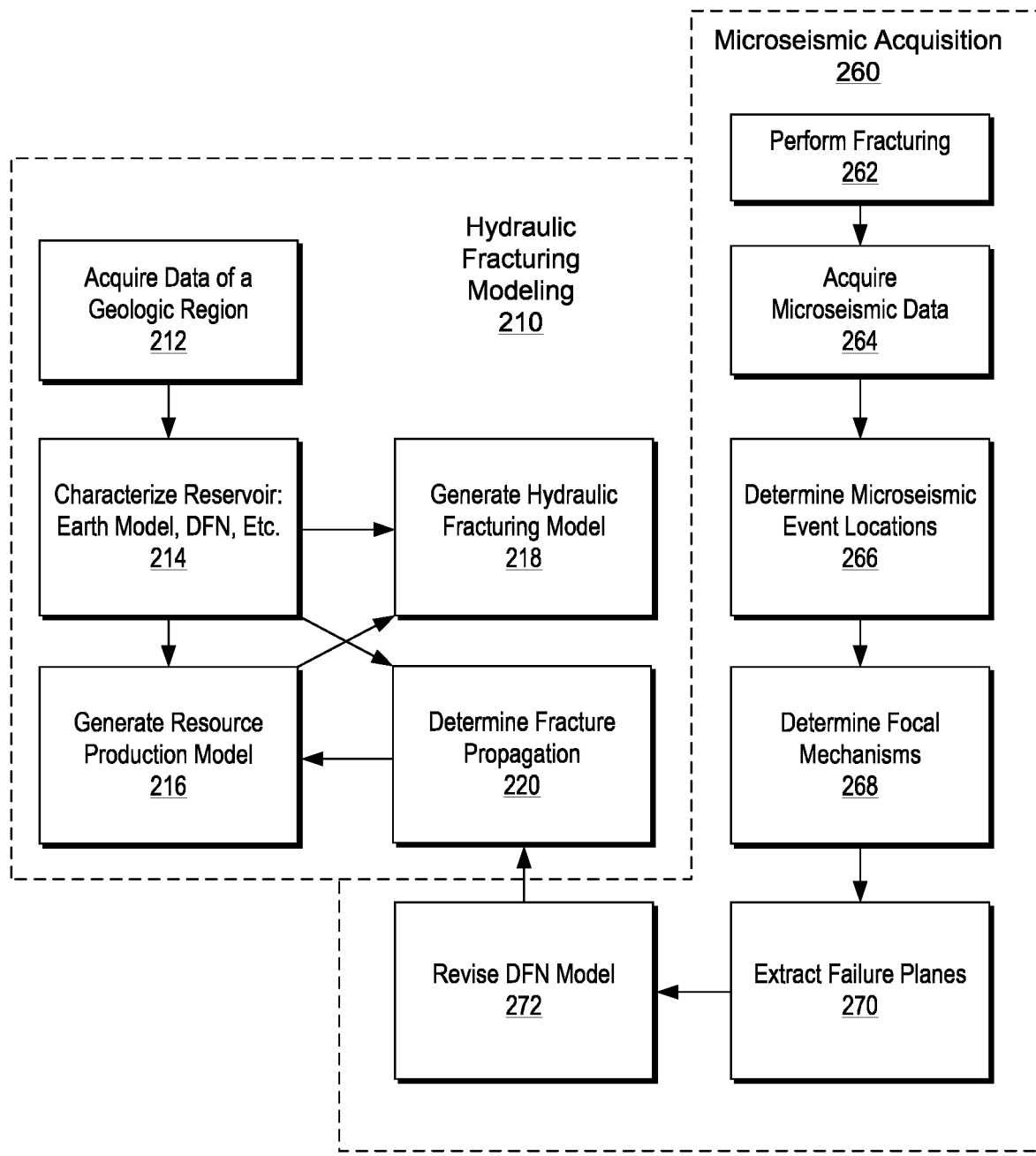
FIG. 2 illustrates an example of a method.

FIG. 2 shows an example of a method 200 that includes various actions associated with hydraulic fracturing modeling 210 and various actions associated with microseismic data acquisition 260. As shown, the method 200 includes an acquisition block 212 for acquiring data of a geologic region, a characterization block 214 for characterizing a reservoir in the geologic region via a 3D earth model and a discrete fracture network (DFN) and optionally one or more other actions, a generation block 216 for generating a resource production model of the geologic region, a generation block 218 for generating a hydraulic fracturing model and a determination block 220 for determining information associated with fracture propagation in the geologic region. As shown, the method 200 includes a performance block 262 for performing hydraulic fracturing in the geologic region, an acquisition block 264 for acquiring microseismic data responsive to generation and/or reactivation of fractures in the geologic region, a determination block 266 for determining microseismic event locations in the geologic region, a determination block 268 for determining one or more focal mechanisms based at least in part on the microseismic event locations, an extraction block 270 for extracting one or more failure planes based at least in part on the determined one or more focal mechanisms in the geologic region, a revision block 272 for revising the DFN model that characterizes the reservoir where, as shown, the revised DFN model can be utilized to inform the determination block 220 as to fracture propagation in the geologic region noting that one or more loops can exist within the method 200 that can be performed responsive to fracturing and data acquisition, which can inform, for example, one or more operations in the geologic region (e.g., further fracturing, further data acquisition, production, etc.).

Mechanical earth models (e.g., 3D earth models, etc.) can be generated from a variety of geologic, petrophysical, geomechanical, and geophysical information, which characterizes complexity and heterogeneity of a reservoir and completion properties in one or more formations of interest (see, e.g., the block 214). As an example, data can be acquired via one or more of 3D seismic surveys, acoustic impedance (AI) and other seismic-derived property volumes (e.g., bulk modulus, Poisson's ratio, etc.), microseismic surveys, sonic logs, rock cores, burial history, petrophysical measurements from well logs, etc. (see, e.g., the block 212). As an example, natural fracture patterns and regional stress field may be mapped using such multi-domain, multi-scale information as borehole images and 2D and 3D seismic surveys, which can then be used to develop and calibrate fracture propagation models (see, e.g., the block 220). As an example, a mechanical earth model may be used to generate maps to assess, perform, etc., one or more of drilling, fracturing, and operational risks. As explained with respect to FIG. 2, the method 200 can include integrating hydraulic fracturing models (see, e.g., the block 218) developed through integration of geologic and structural models with production simulation models and risk maps (see, e.g., the block 216), which can provide for decision making for completion operations, execution of an optimum stimulation plan, etc.

As an example, hydraulic fracturing models developed through the integration of geologic and structural reservoir characterization models, fracture propagation models and production models may be utilized in evaluating different unconventional completion operations. For example, consider operations that include real-time microseismic data acquisition for evaluating performance of hydraulic fracturing stimulations and in providing information about for calibrating and developing revised fracture models for one or more of ongoing and future stimulations.

Microseismic monitoring provides a valuable tool to evaluate hydraulic fracture treatments in real-time and can be utilized in planning and managing reservoir development. Microseismic event locations, source characteristics and attributes can provide estimates of hydraulic fracturing geometry that can be evaluated with respect to a completion plan and expected fracture growth. Microseismic event derived attributes such as fracture azimuth, height and length, location and complexity, may be utilized to determine the extent of fracture coverage of the reservoir target and effective stimulated volume, as well as in diagnosing under-stimulated sections of the reservoir and in planning re-stimulation of under-producing perforations and wells. Microseismic event locations can also help to avoid hazards during stimulation (e.g. faults, karst, aquifers, etc.). As an example, a method can include modifications to one or more treatment plans and operations based at least in part on microseismic interpretations.

As an example, microseismic monitoring results may be used in updating and calibrating geologic and structural models used in planning completions. Information about the inelastic deformation of the fracture source (fracture plane orientation and slip) that generates the microseismic signal may be, for example, obtained through moment tensor inversion. The moment tensor can describe various source types (e.g. explosion, tensile crack opening or closing, slip on a plane or combination thereof). As hydraulic fracture microseismicity can be a result of high-pressure injection of fluids and proppant to open fracture paths, moment tensor inversion can be used to determine fracture opening and closing events from shear displacements, providing valuable information to engineers as to whether their fractures pathways are open or closed. Moment tensors may also provide a direct measurement of the local stress-strain regime, fracture orientations, and changes to the local stresses and fracture orientation through time that can be used to develop and calibrate discrete fracture network (DFN) models.

Integrated workflows leveraging multi-scale, multi-domain measurements and microseismic interpretation enables optimization of hydraulic fracturing treatment for increased production. These integrated completions planning workflows may use a wide variety of information about the geology (e.g., lithology, stress contrast, natural fracturing, structural or depositional dip, faulting), and the associated rock properties, (e.g., noise, slowness, anisotropy, attenuation) to improve hydraulic fracturing operations to lead to improved hydraulic fracture stimulations, completion plans, and well placement and, thereby, improved production. As an example, microseismic event locations and attributes may be integrated and compared with treatment pressure records, proppant concentration, and injection rate to better perform field operations.

Figure 3:
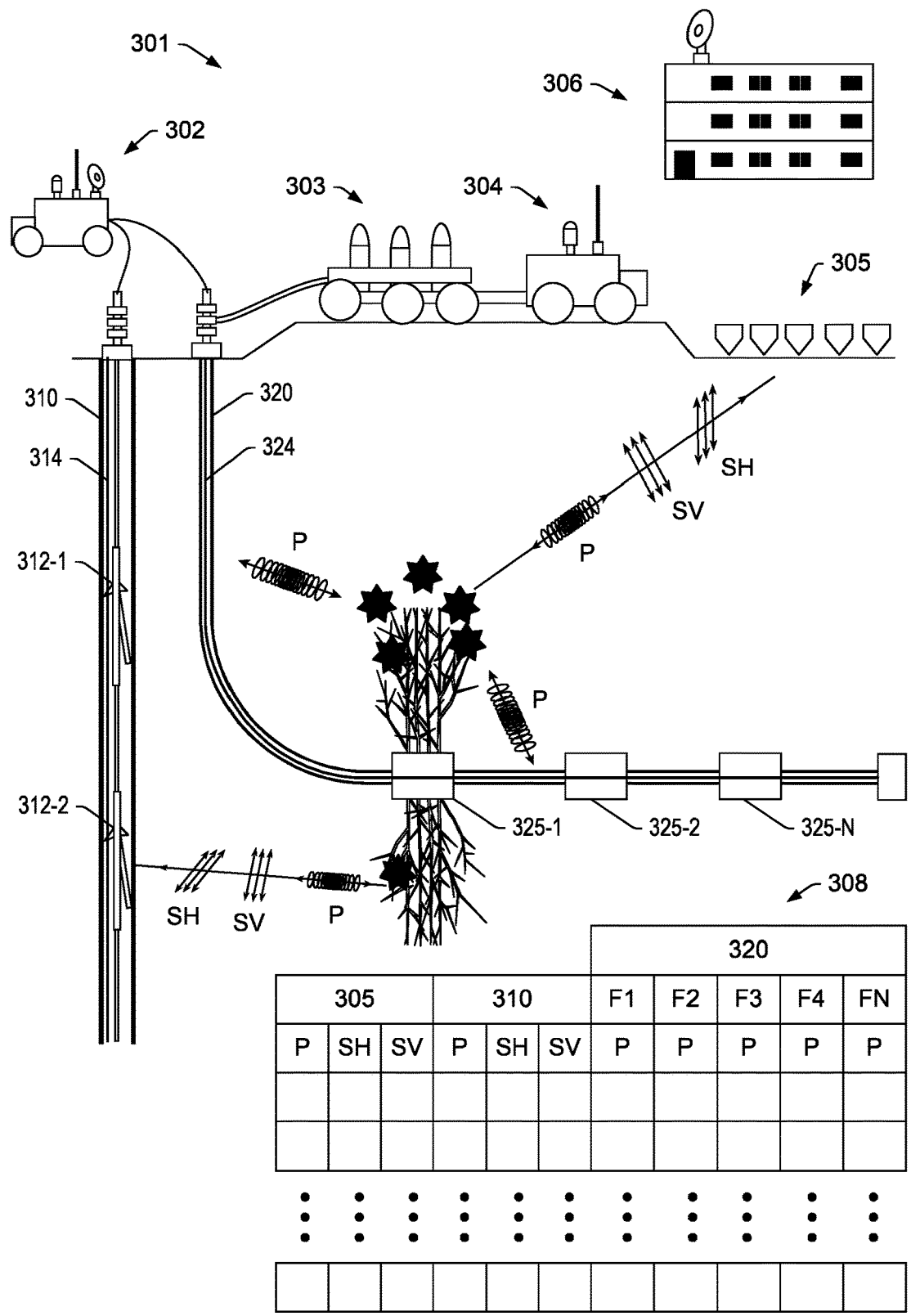
FIG. 3 illustrates an example of a system.

FIG. 3 shows an example of a geologic environment 301 that includes monitoring equipment 302, a pump 303, equipment 304, a seismic sensor or receiver array 305 and a remote facility 306. As shown, various types of communication may be implemented such that one or more pieces of equipment can communicate with one or more other pieces of equipment. As an example, equipment can include geopositioning equipment (e.g., GPS, etc.). As an example, equipment can include one or more satellites and one or more satellite links (e.g., dishes, antennas, etc.).

In the example of FIG. 3, a monitoring well 310 and a treatment well 320 are disposed in the geologic environment 301. The monitoring well 310 includes a plurality of sensors 312-1 and 312-2 and optionally a fiber cable sensor 314 and the treatment well 320 optionally includes a fiber cable sensor 324 and one or more sets of perforations 325-1, 325-2, 325-N (e.g., as generated by perforating equipment, which may utilize force generated via one or more mechanisms).

Equipment in the example of FIG. 3 can be utilized to perform one or more methods. As an example, data associated with hydraulic fracturing events may be acquired via various sensors. As an example, P-wave data (compressional wave data) can be utilized to assess such events (e.g., microseismic events). Such information may allow for adjusting one or more field operations. As an example, data acquired via the fiber cable sensor 324 can be utilized to generate information germane to a fluid flow-based treatment process (e.g., to determine where fluid pumped into a well may be flowing, etc.).

FIG. 3 shows an example of a table or data structure 308 with some examples of information that may be acquired via the seismic sensor array 305 (e.g., P-wave as "P", SH-wave as "SH", SV-wave as "SV"), sensors of the monitoring well 310 (e.g., P, SH, SV) and sensors of the treatment well 320 (e.g., P). In the example of FIG. 3, information may be sensed with respect to position, for example, sensor position, position along a fiber cable sensor, etc. As shown, the fiber cable sensor 324 may sense information at a variety of positions along the fiber cable sensor 324 within the treatment well 320 (see, e.g., F1, F2, F3, F4 to FN).

In the example of FIG. 3, the set of perforations 325-1 are shown as including associated fractures and microseismic events that generate energy that can be sensed by various sensors in the geologic environment 301. Arrows indicate a type of wave that may be sensed by an associate sensor. For example, as mentioned with respect to the table or data structure 308, the seismic sensor array 305 can sense P, SV and SH waves while the fiber cable sensor 324 can sense P waves.

As an example, the equipment 302 can be operatively coupled to various sensors in the monitor well 310 and the treatment well 320. As an example, the equipment 302 may be on-site where wires are coupled from sensors to the equipment 302, which may be vehicle-based equipment (e.g., a data acquisition and/or control truck, etc.). As an example, the equipment 304 may control the pump 303 (e.g., or pumps) that can direct fluid into the treatment well 320. For example, a line is shown as a conduit that is operatively coupled between the pump 303 and the treatment well 320.

As an example, information acquired by the equipment 302 may be utilized to control one or more treatment processes controlled by the equipment 304. For example, the equipment 302 and the equipment 304 may be in direct and/or indirect communication via one or more communication links (e.g., wire, wireless, local, remote, etc.). In such an example, information acquired during a treatment process can be utilized in real-time (e.g., near real-time) to control the treatment process. For example, the equipment 302 can acquire data via sensors in the wells 310 and 320 and output information to the equipment 304 for purposes of controlling an on-going treatment process. As an example, such information may be utilized to control and/or to plan a subsequent treatment process, for example, additionally or alternatively to controlling an on-going treatment process.

As an example, a treatment process can include hydraulic fracturing. As an example, acquired data can include microseismic event data. As an example, a method can include determining the extent of rock fracturing induced by a treatment process, which may aim to stimulate a reservoir.

As an example, a method can include hydraulic fracture monitoring (HFM). As an example, a method can include monitoring one or more types of reservoir stimulation processes where one or more of such processes may be performed in stages. As an example, a stage may be of a duration of the order of hours or longer (e.g., several days). As an example, a method can include determining the presence, extent, and/or associated volume of induced fractures and fracture networks, which may be utilized for calculating an estimated reservoir stimulation volume (e.g., ESV) that may assist, for example, in economic evaluation of well performance.

As an example, real-time data may be rendered to a display (e.g., as a plot, plots, etc.). As an example, real-time data may be assessed in real-time (e.g., near real-time that includes computation and transmission times) during perforation flow for one or more sets of perforations. In such an example, such assessments may allow a treatment process to be optimized during the treatment process in real-time (e.g., near real-time). Such assessments may be utilized for one or more post treatment analyses, for example, to plan, perform, control, etc. one or more future treatments (e.g., in a same well, a different well, etc.).

As an example, a method can include acquiring data germane to flow in one or more wells and/or via perforations in one or more wells. As an example, a method can include acquiring data germane to locating one or more fractures. As an example, a method can include a real-time portion and a post-process portion.

As an example, a data acquisition technique may be implemented to help understand a formation, a reservoir, a bore, a bore wall, a fracture, fractures, a fracture network, etc. As an example, a hydraulically induced fracture or fractures may be monitored using one or more borehole seismic methods. For example, while a fracture is being created in a treatment well, a multicomponent receiver array in a monitor well may be used to record microseismic activity generated by a fracturing process.

As mentioned, equipment may include fracturing equipment where such equipment may be employed to generate one or more fractures in a geologic environment. As an example, a method to generate fractures can include a delivery block for delivering fluid to a subterranean environment, a monitor block for monitoring fluid pressure and a generation block for generating fractures via fluid pressure. As an example, the generation block may include activating one or more fractures. As an example, the generation block may include generating and activating fractures.

As an example, a method may be referred to as a treatment method or a "treatment". Such a method may include pumping an engineered fluid (e.g., a treatment fluid) at high pressure and rate into a reservoir via one or more bores, for example, to one or more intervals to be treated, which may cause a fracture or fractures to open (e.g., new, pre-existing, etc.).

As an example, a fracture may be defined as including "wings" that extend outwardly from a bore. Such wings may extend away from a bore in opposing directions, for example, according in part to natural stresses within a formation. As an example, proppant may be mixed with a treatment fluid to keep a fracture (or fractures) open when a treatment is complete. Hydraulic fracturing may create high-conductivity communication with an area of a formation and, for example, may bypass damage that may exist in a near-wellbore area. As an example, stimulation treatment may occur in stages. For example, after completing a first stage, data may be acquired and analyzed for planning and/or performance of a subsequent stage.

Size and orientation of a fracture, and the magnitude of the pressure to create it, may be dictated at least in part by a formation's in situ stress field. As an example, a stress field may be defined by three principal compressive stresses, which are oriented perpendicular to each other (see, e.g., FIG. 2). The magnitudes and orientations of these three principal stresses may be determined by the tectonic regime in the region and by depth, pore pressure and rock properties, which determine how stress is transmitted and distributed among formations.

Where fluid pressure is monitored, a sudden drop in pressure can indicate fracture initiation of a stimulation treatment, as fluid flows into the fractured formation. As an example, to break rock in a target interval, fracture initiation pressure exceeds a sum of the minimum principal stress plus the tensile strength of the rock. To determine fracture closure pressure, a process may allow pressure to subside until it indicates that a fracture has closed. A fracture reopening pressure may be determined by pressurizing a zone until a leveling of pressure indicates the fracture has reopened. The closure and reopening pressures tend to be controlled by the minimum principal compressive stress (e.g., where induced downhole pressures exceed minimum principal stress to extend fracture length).

After performing fracture initiation, a zone may be pressurized for furthering stimulation treatment. As an example, a zone may be pressurized to a fracture propagation pressure, which is greater than a fracture closure pressure. The difference may be referred to as the net pressure, which represents a sum of frictional pressure drop and fracture-tip resistance to propagation (e.g., further propagation).

As an example, a method may include seismic monitoring during a treatment operation (e.g., to monitor fracture initiation, growth, etc.). For example, as fracturing fluid forces rock to crack and fractures to grow, small fragments of rock break, causing tiny seismic emissions, called microseisms. Equipment may be positioned in a field, in a bore, etc. to sense such emissions and to process acquired data, for example, to locate microseisms in the subsurface (e.g., to locate hypocenters). Information as to direction of fracture growth may allow for actions that can "steer" a fracture into a desired zone(s) or, for example, to halt a treatment before a fracture grows out of an intended zone. Seismic information (e.g., information associated with microseisms) may be used to plan one or more stages of fracturing operations (e.g., location, pressure, etc.).

Figure 4:
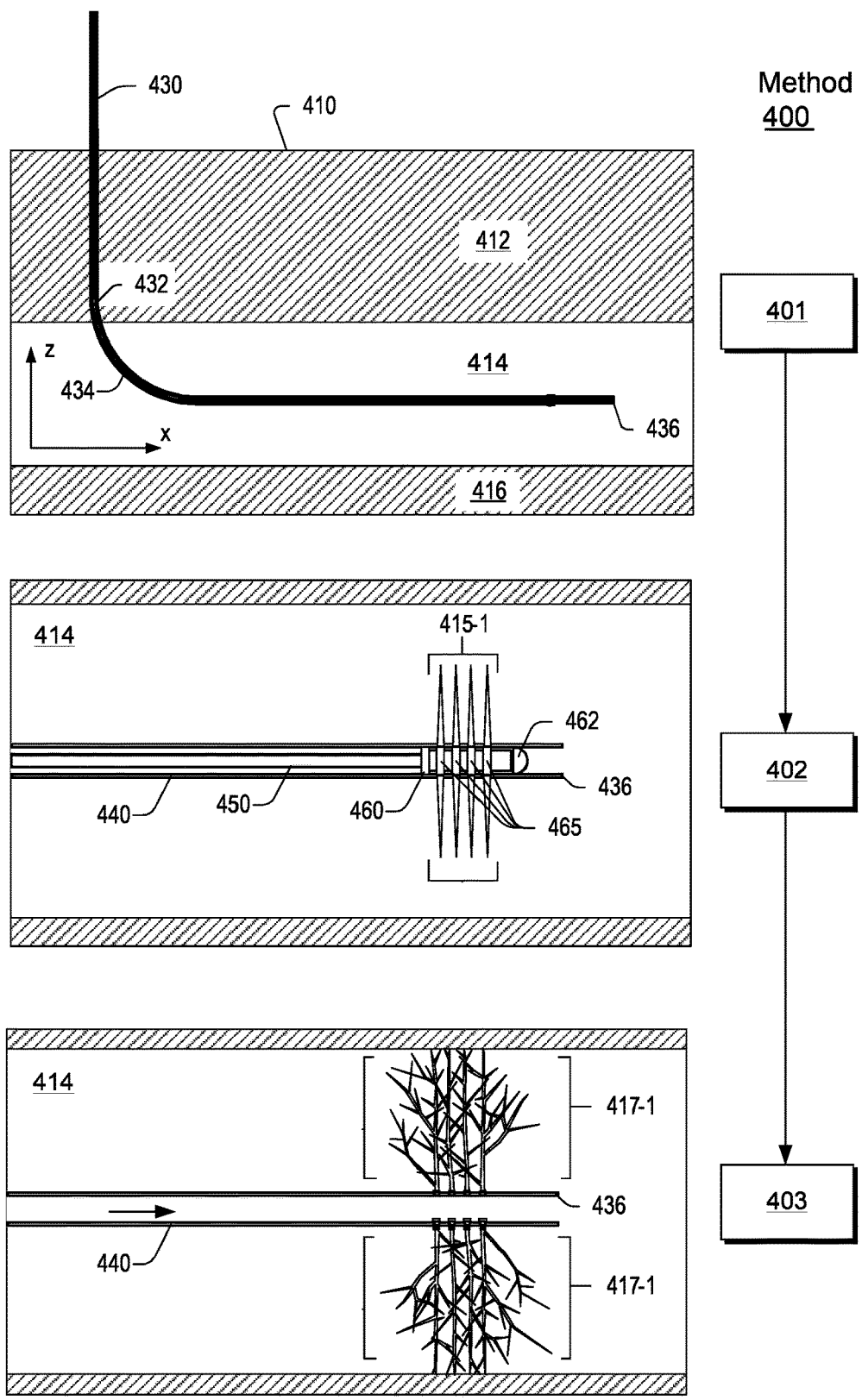
FIG. 4 illustrates an example of a portion of a method.
Figure 5:
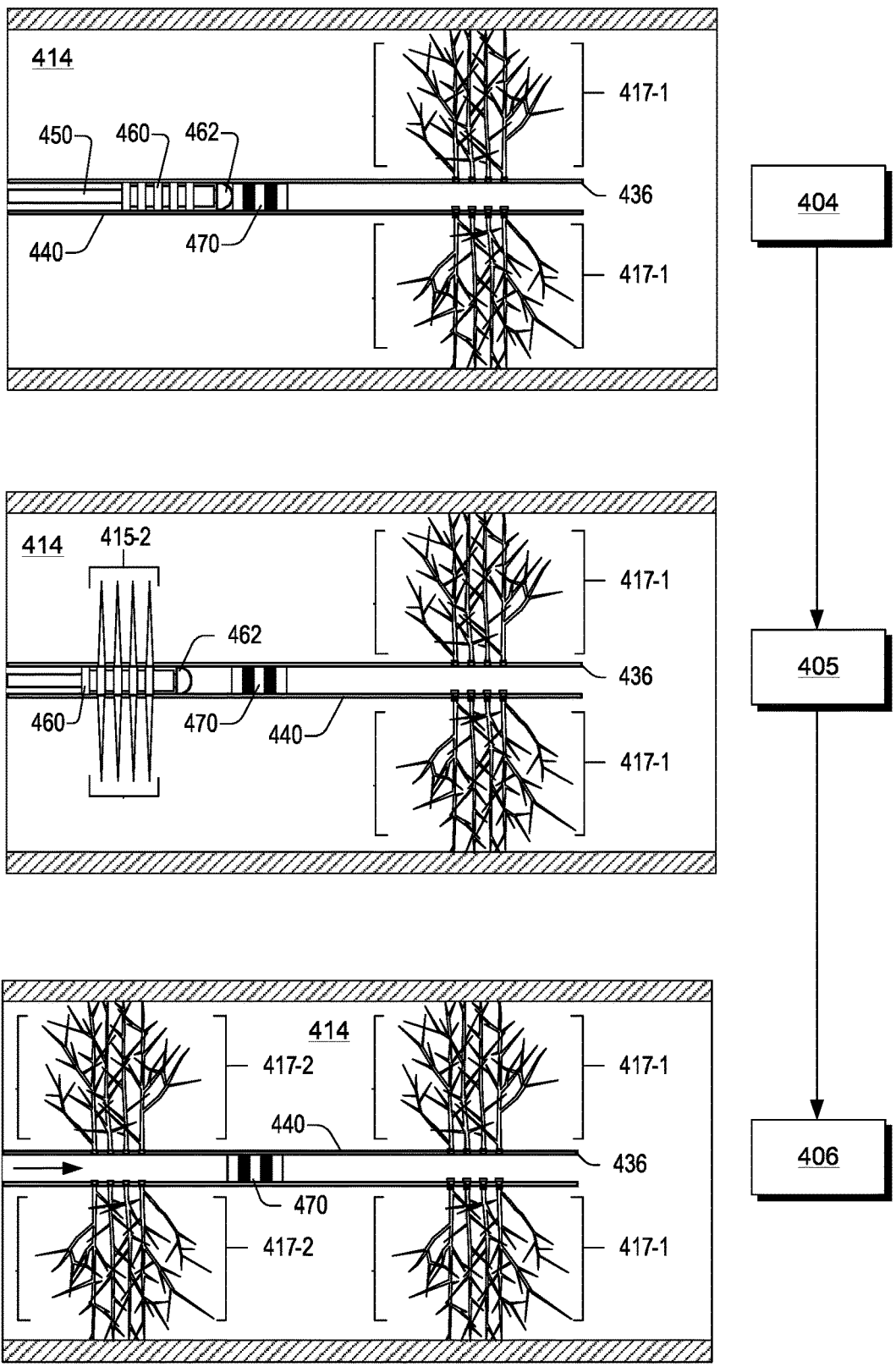
FIG. 5 illustrates an example of a portion of the method of FIG. 4.

FIGS. 4 and 5 show an example of a method 400 that includes generating fractures. As shown, the method 400 can include various operational blocks such as one or more of the blocks 401, 402, 403, 404, 405 and 406. The block 401 may be a drilling block that includes drilling into a formation 410 that includes layers 412, 414 and 416 to form a bore 430 with a kickoff 432 to a portion defined by a heel 434 and a toe 436, for example, within the layer 414.

As illustrated with respect to the block 402, the bore 430 may be at least partially cased with casing 440 into which a string or line 450 may be introduced that carries a perforator 460. As shown, the perforator 460 can include a distal end 462 and charge positions 465 associated with activatable charges that can perforate the casing 440 and form channels 415-1 in the layer 414. Next, per the block 403, fluid may be introduced into the bore 430 between the heel 434 and the toe 436 where the fluid passes through the perforations in the casing 440 and into the channels 415-1. Where such fluid is under pressure, the pressure may be sufficient to fracture the layer 414, for example, to form fractures 417-1. In the block 403, the fractures 417-1 may be first stage fractures, for example, of a multistage fracturing operation.

Per the block 404, additional operations are performed for further fracturing of the layer 414. For example, a plug 470 may be introduced into the bore 430 between the heel 434 and the toe 436 and positioned, for example, in a region between first stage perforations of the casing 440 and the heel 434. Per the block 405, the perforator 460 may be activated to form additional perforations in the casing 440 (e.g., second stage perforations) as well as channels 415-2 in the layer 414 (e.g., second stage channels). Per the block 406, fluid may be introduced while the plug 470 is disposed in the bore 430, for example, to isolate a portion of the bore 430 such that fluid pressure may build to a level sufficient to form fractures 417-2 in the layer 414 (e.g., second stage fractures).

In a method such as the method 400 of FIGS. 4 and 5, it may be desirable that a plug (e.g., the plug 470) includes properties suited to one or more operations. Properties of a plug may include mechanical properties (e.g., sufficient strength to withstand pressure associated with fracture generation, etc.) and may include one or more other types of properties (e.g., chemical, electrical, etc.). As an example, it may be desirable that a plug degrades, that a plug seat degrades, that at least a portion of a borehole tool degrades, etc. For example, a plug may be manufactured with properties such that the plug withstands, for a period of time, conditions associated with an operation and then degrades (e.g., when exposed to one or more conditions). In such an example, where the plug acts to block a passage for an operation, upon degradation, the passage may become unblocked, which may allow for one or more subsequent operations.

Figure 6:
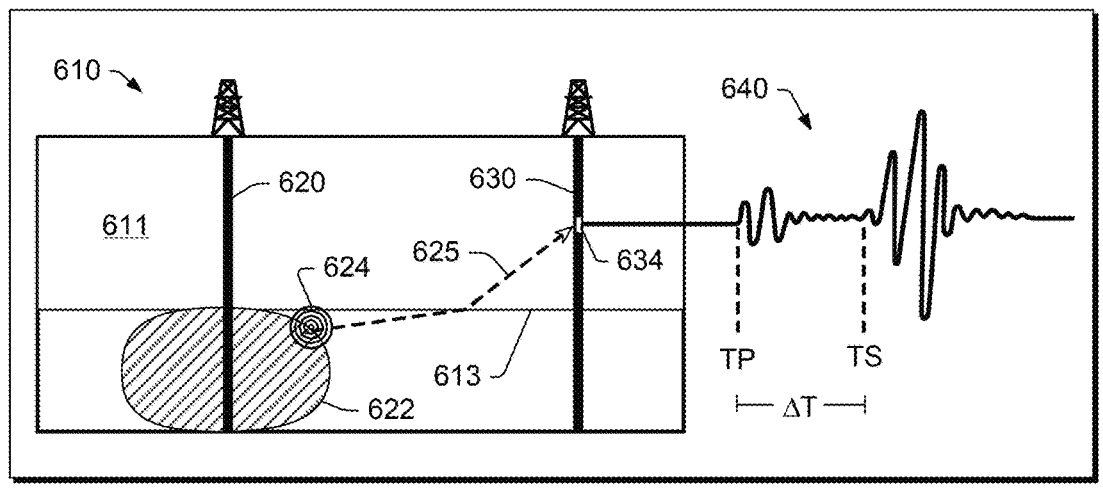
FIG. 6 illustrates examples of techniques and equipment associated with microseismicity.
Figure 6:
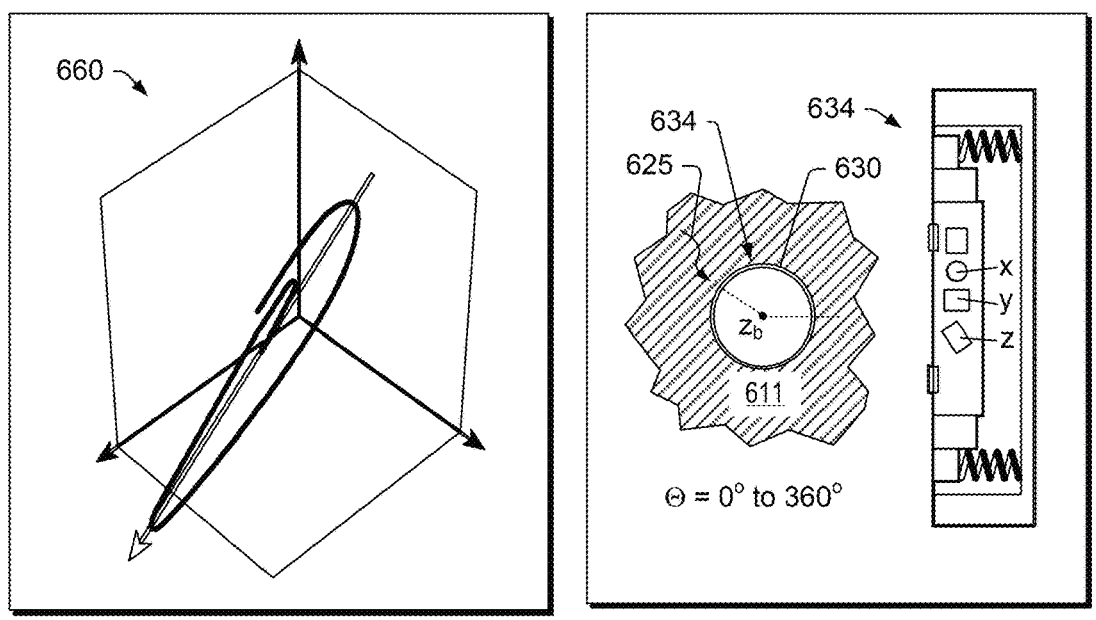
Figure 6:
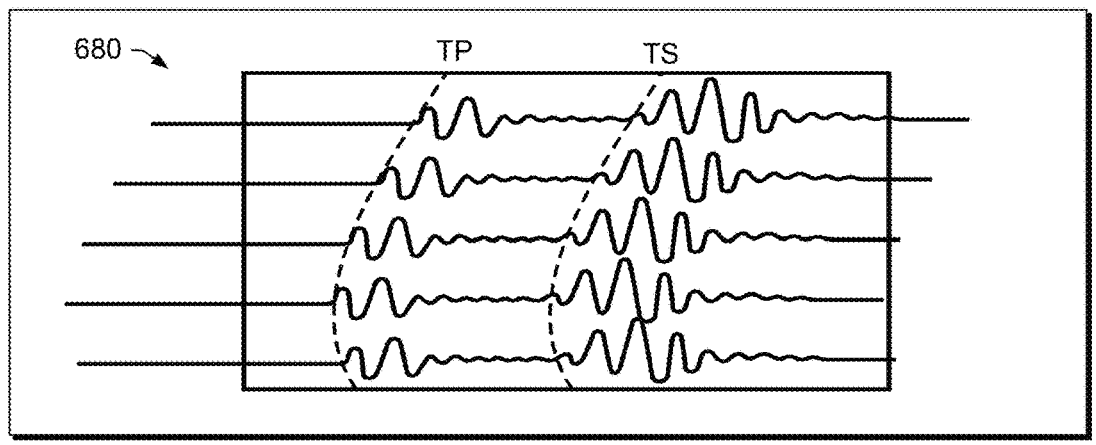

FIG. 6 shows an example of a microseismic survey 610, which may be considered to be a method that implements equipment for sensing elastic wave emissions of microseismic events (e.g., elastic wave energy emissions caused directly or indirectly by a treatment). As shown, the survey 610 is performed with respect to a geologic environment 611 that may include a reflector 613. The survey 610 includes an injection bore 620 and a monitoring bore 630. Fluid injected via the injection bore 620 generates a fracture 622 that is associated with microseismic events such as the event 624. As shown in the example of FIG. 6, energy 625 of a microseismic event 624 may travel through a portion of the geologic environment 611, optionally interacting with one or more reflectors 613, and pass to the monitoring bore 630 where at least a portion of the energy 625 may be sensed via a sensing unit 634, which may include a shaker, three-component geophone accelerometers isolated from a sensing unit body (e.g., via springs, etc.), coupling contacts, etc. In the example of FIG. 6, the sensed energy 640 includes compressional wave energy (P-wave) and shear wave energy (S-wave).

As shown in the example of FIG. 6, one or more sensors of the sensing unit 634 can be oriented in the monitoring bore 630 with respect to the position of the microseismic event 624 and/or the energy 625 as received by at least one of the one or more sensors of the sensing unit 634. As an example, the orientation of a sensor may be defined in a coordinate system or coordinate systems such that orientation information may be defined as to one or more microseismic events and/or energy received as associated with one or more microseismic events. FIG. 6 shows an approximate diagram of a cross-sectional view of the sensing unit 634 in the monitoring bore 630 of the geologic environment 611 where energy 625 is arriving at the sensing unit 634 at an angle Θ, which may be defined in a range of angles from approximately 0 degrees to approximately 360 degrees (e.g., where 0 and 360 degrees may be the same).

As an example, a sensing unit (e.g., sensing body) can include one or more components that may provide information as to position. For example, consider an inclinometer and/or a magnetometer. As an example, consider one or more components of a tool that includes a three-axis inclinometer and a three-axis magnetometer to make measurements for determining the three parameters of tool orientation: tool deviation, tool azimuth, and relative bearing. As an example, such information may be acquired, where available, and utilized for purposes of sensor orientation calibration. As an example, a joint calibration of sensor orientation and a velocity model may utilize such information in addition to other information (e.g., seismic data, etc.).

Microseismic energy as associated with microseismic events (e.g., microseisms) can be induced by change in stress and pore pressure associated with one or more hydraulic fracturing operations (e.g., perforating, injecting fluid, etc.) and/or change in a subterranean environment caused by one or more other field operations (e.g., a drill bit impacting rock, etc.). Microseismic energy can be generated by slippages or tensile deformations that occur along pre-existing planes of weakness (e.g., natural fractures). As an example, if an array of tri-axial receivers is situated at depth near a hydraulic fracture, compressional (primary or P) and shear (secondary or S) waves may be detected and locations of the events calculated (e.g., estimated, etc.). As microseisms tend to be quite small (e.g., on a Richter scale), sensor related factors can affect an ability to measure the energy and/or determine a location as an origin of the energy. The location of an individual microseism may be deduced, for example, from arrival times of the P and S waves (e.g., to provide distance and elevation) and from particle motion of the P-wave (e.g., to provide azimuth and elevation from a sensor or sensor array to the event). As to particle motion information, as particle motion can be affected by various factors including gravity, sensor orientation can be determined through a process known as calibration. The output of a calibration process for one or more sensors (e.g., of a sensing unit, a sensor array, etc.) can be orientation information (e.g., sensor orientation calibration information, etc.). As an example, one or more types of energy may be sensed to facilitate sensor orientation calibration, which, as mentioned, can be part of a process that is performed jointly with velocity model calibration. As to types of energy, energy generated by one or more of perforation shots, string shots, or other seismic sources in a treatment well and/or other nearby well(s) may be utilized. Factors that can impact accuracy of microseismic locations and source parameter determination include the accuracy of sensor positioning (e.g., location and orientation), knowledge of the velocity structure in the reservoir (e.g., velocity model), and accuracy of first arrival picks and particle motion estimates for single-well monitoring. Some factors are tool issues and may be addressed by improved tool features (e.g., sensors, electrical noise, vector fidelity, coupling or sampling rate). As mentioned, a joint calibration of sensor orientation and a velocity model can improve accuracy of microseismic event determinations (e.g., as to one or more of location, time, magnitude, etc.).

As an example, a method can include receiving microseismic data of microseismic events as acquired by sensors during hydraulic fracturing of a geologic region; jointly calibrating sensor orientation of the sensors and a velocity model of the geologic region via an objective function and the microseismic data; and, based at least in part on the jointly calibrating, determining one or more locations of the one or more microseismic events. In such an example, hydraulic fracturing can include one or more operations associated with fracturing rock in a subterranean environment (e.g., perforations, etc.). As an example, one or more types of seismic energy may be sensed and utilized for performing a joint calibration. As an example, sensors may be of one or more sensing units and/or be in the form of a sensor array. As an example, where sensors are in and/or carried by a sensing unit (e.g., a sensing body), determinations as to orientation may be performed for one or more of the sensors, which may include one or more determinations as to the orientation of the sensing unit (e.g., a sensing body). As an example, sensors may be fixed in a sensing unit (e.g., a sensing body) such that as the sensing unit changes orientation, the sensors change orientation.

As illustrated in the example of FIG. 6, a sensing unit may include springs, biasing members, etc. that can be deployed to cause one or more portions of the sensing unit to apply pressure to a wall of a borehole, which may help to stabilize the position (e.g., orientation) of the sensing unit in the borehole. As an example, such features may be controllable (e.g., downhole, from surface, etc.). As an example, a borehole seismic array tool can include a number of tri-axial geophones where, for example, there may be spacings between at least some of them (e.g., consider a tool with eight tri-axial geophones with approximately 30 m). As an example, a tool may be positioned in a monitoring borehole (e.g., a well, etc.) that is within a distance from a borehole (e.g., a well, etc.) that utilized for performing one or more hydraulic fracturing operations. In such an example, a distance may be approximately 1000 meters or less (e.g., 3000 feet or less). As energy decays with distance, a further distance can result in reception and sensing of less energy.

During the process of hydraulic fracturing, background noise and microseismic events may continuously recorded by a borehole seismic tool (e.g., sensor array) and transmitted via one or more transmission techniques to surface equipment (e.g., uphole). Listening may continue for a period of time after a pumping operation has ceased until additional events are no longer detected.

As an example, surface recording equipment can receive the information transmitted by one or more sensors (e.g., of one or more tools) and utilize one or more processors to process the information. Such processing can include, for example, separating signal from background noise. As an example, surface equipment may include a satellite transmission that can sends microseismic data (e.g., or processed data) in real time to a computing facility for one or more types of processing, analysis, etc. As an example, the computing facility may perform one or more actions and transmit results back to the surface equipment or other field equipment. For example, location information of events may be transmitted to the field via one or more networks. As an example, joint calibrating of sensor orientation and a velocity model may be performed utilizing one or more computing devices and/or computing systems, which may be local to a field operation and/or remote from the field operation.

As an example, a truck may be field equipment with computational resources (e.g., one or more processors, etc.) that can perform a joint calibration process. As an example, a remote facility can include a computing system that can perform a joint calibration process. As an example, a computing system can be an "imaging" system that outputs locations of microseismic events based at least in part on sensor data. Such a machine can be an imaging machine that operates to acquire sensor information and to output an image of a field operation that identifies one or more locations of one or more microseismic events. As an example, a joint calibration method can improve the operation of such a machine (e.g., improve the functioning of the machine). For example, accuracy and/or computational efficiency may be improved. As an example, a machine, which may be physically distributed, can include circuitry that can generate animations. For example, consider generated maps that can be animated to show progressive fracture development with time as well as the subsurface response to pumping procedures, etc. As an example, such an animation can be rendered to one or more displays (e.g., of the machine, operatively coupled to the machine, etc.).

FIG. 3 shows some examples of machines that can include one or more processors, memory, interfaces, etc. For example, the monitoring equipment 302 (e.g., a truck, etc.), the equipment 304 (e.g., a truck, etc.) and the remote facility 306. As an example, a vehicle may include wheels and an engine and/or a motor that can propel the vehicle from one site to another where the vehicle includes one or more processors, memory, interfaces, etc. to perform at least a portion of a joint calibration method as to sensor orientation and a velocity model.

As an example, a sensor orientation may be defined with respect to a direction of gravity. For example, one or more coordinate systems may be defined at least in part with respect to gravity.

Sensed energy may be analyzed, for example, to determine one or more of distance and azimuth from a sensor to a source of an elastic wave emission and depth of a source of an elastic wave emission (e.g., to determine location information, etc.). In a fracturing operation, a source of an elastic wave emission may be registered as an event, which can include a time, a location and one or more acquired signals (e.g., traces). Information associated with an event may be analyzed to determine one or more of location and magnitude.

As an example, distance (d) to an event may be derived by measuring a time difference ($\Delta T$) between arrival times for a P-wave (TP) and an S-wave (TS). The value of the distance d may depend on use of a velocity model that characterizes velocity of elastic wave energy (e.g., elastic waves) with respect to depth. A velocity model may describe P-wave velocity and S-wave velocity with respect to depth (e.g., variation in material, pressures, etc. of a geologic environment).

Azimuth to a microseismic event may be determined by analyzing particle motion of P-waves, for example, using hodograms. FIG. 6 shows an example of a hodogram 660 as a plot of sensed energy along at least two geophone axes as a function of time. A hodogram may be a graph or curve that displays time versus distance of motion. For example, a hodogram may be a crossplot of two components of particle motion over a time window. Hodograms may be part of a borehole seismologic survey where they may be used to determine arrival directions of waves and to detect shear-wave splitting.

As to determination of depth of a microseismic event, as illustrated in a plot 680, P-wave and S-wave arrival delays between sensors, or moveout, at the monitoring bore 630 may be analyzed.

Microseismicity recorded during multistage fracture treatments may provide disperse "clouds" of events (e.g., located at individual event hypocenters). As an example, a method can include analyzing clouds of events to extract planar-type features, which may be indicative of fracture location, directions of stresses, etc.

Effectiveness of hydro-fracturing, as a stimulation method, can depend on multiple variables and competing effects. For instance, a hydraulic fracture, or stage-fracture, may be expected to propagate deeply into a pay zone and increase surface area through which hydrocarbons can be drained from a formation to a well. As to predicting behavior, for example, via modeling, various variables (e.g., local stress, natural fracture network, injection rate, fluid viscosity, etc.) can act together to determine the size, orientation, aperture and geometry of the resulting stage-fracture values, for such variables may not be known a priori, may be known with some uncertainty, etc.

During creation or propagation, a hydraulic fracture introduces changes in a stress field around it. For example, an increase in the minimum horizontal stress, $S_{hmin}$ (e.g., "stress shadow effect"), can affect pressure to open a fracture (e.g., a subsequent fracture) and its shape, thus potentially affecting in a negative way effectiveness of a hydraulic-fracturing job. On the other hand, these stress changes may also "reactivate" pre-existing natural fractures thorough phenomena such as shearing and dilatation, which potentially could have a positive effect of increasing permeability within an Estimated Stimulation Volume (ESV). As an example, a stimulation process may reactivate a number of natural fractures to increase permeability within a region of interest, which may be, post-stimulation, an ESV. As an example, a natural fracture may be considered to be active at some time or times during its existence and may be considered to be reactivated in response to an intervention such as a stimulation treatment (e.g., hydraulic fracturing, etc.).

Stress shadows, microseismicity, stimulated rock volume and production tend to be related in a complex manner. It may be desirable to understand better such processes, for example, to help predict magnitude and consequences of a stress shadow and ESV. As an example, a method may include establishing one or more linkages between fracture geometry, microseismicity, stress shadow, ESV and permeability.

As mentioned with respect to FIG. 2, a method may be a workflow that may include worksteps. As an example, a method can include receiving input information from a multidimensional mechanical earth model (e.g., consider a 3D MEM) and receiving input information as to fracture geometry (e.g., consider geometry of a discrete fracture network (DFN)). In such an example, the method may be formulated numerically where one or more numerical techniques may be applied to solve equations for output values (e.g., results). As an example, starting from a 3D MEM and guidelines on fracture geometry, a numerical solution may be output for permeability enhancements, microseismicity and RFV.

Microseismic monitoring can be utilized for evaluating effectiveness of reservoir stimulation, for example, in unconventional reservoirs. As an example, results of microseismic monitoring of hydraulic fractures can allow engineers to understand better various aspects of one or more of fracture networks, production, and geohazards (e.g., fracturing induced water production from adjacent formations or fault-related fluid loss). Microseismic results can be integrated with and used to calibrate a mechanical earth model (MEM) and/or a fracture model, which may be used, for example, to predict fracture geometry and conductivity from stimulation operations. As an example, real-time microseismic monitoring can facilitate making of timely decisions, which may, for example, help to reduce or prevent problems such as those related to geohazards, treatment overlap, poor coverage of the formation, poor cement, or completion hardware failure.

Microseismic monitoring can aim to provide event locations with a desired amount of accuracy as to such locations. A desired amount of accuracy may depend on various factors such as, for example, equipment available, offset wells available, etc. Accuracy and precision of microseismic results can depend on various factors such as, for example, quality of microseismic signals, suitability of survey geometry, accuracy of treatment and monitor wellbore locations, accuracy of a velocity model, and/or workflow used to map microseismic events. Various aspects of a velocity model can influence accuracy of mapped hypocenter locations. For example, an inaccurate velocity model can result in location errors of the order of hundreds of feet (e.g., 30 meters or more).

A particular factor that can impact accuracy of event locations is orientation of a sensor or sensors. For example, where orientation is know more precisely, with greater accuracy, accuracy of event locations may be improved. As an example, where a method can provide information as to orientation of one or more sensors, such information may be utilized for one or more purposes. As an example, where a sensor is orientable while downhole, information as to its orientation may be utilized to adjust orientation of the sensor. As an example, a sensor may be orientable via equipment that may operate under instruction from a surface controller and/or via equipment that may operate under instruction from a downhole controller. As an example, downhole equipment may be adjustable via one or more commands transmitted downhole to cause an adjustment to the downhole equipment. As an example, after performing a stage of a hydraulic fracturing operation, a joint calibration as to sensor orientation and velocity model may output sensor orientation information that can be utilized to adjust the orientation of one or more sensors for acquisition of data during performance of a subsequent stage of the hydraulic fracturing operation. As an example, such a subsequent stage may be adjusted based at least in part on output of such a joint calibration. For example, where one or more pieces of equipment for an operation or operations such as, for example, one or more of perforating, fracturing, injecting, etc., are adjustable (e.g., translatably, rotatably, etc.), one or more adjustments may be made for purposes of performing one or more of the aforementioned operations based at least in part on output as to sensor orientation and/or output as to velocity model and/or output as to location or locations of one or more microseismic events (e.g., hypocenters, etc.).

A velocity model can account for how seismic energy travels within a geologic environment. Velocity, as a property of a geologic environment, can be a medium-distance divided by a traveltime of seismic energy. Velocity can be determined via one or more techniques (e.g., laboratory measurements, acoustic logs, vertical seismic profiles, velocity analysis of seismic data, etc.). Velocity may vary vertically, laterally and azimuthally in anisotropic media such as rocks; noting that velocity tends to increase with depth in the Earth because compaction reduces porosity. Velocity may vary as a function of how it is derived from data.

In seismology, seismic data, vertical seismic profiles and/or well log data may be used to perform an inversion that can generate a model as a result where the model can model layers, for example, including their thickness (e.g., h), density (e.g., $\rho$) and P- and S-wave velocities (e.g., Vp and Vs or $V_{SH}$ and $V_{SV}$).

As survey design and event location workflows may be limited in flexibility, as an example, a method can include enhancing a velocity model. Such a method can include processing information that can enhance accuracy in an effort to help minimize uncertainty associated with one or more mapped event locations.

Microseismic monitoring results can be generated via use of a velocity model. As an example, a velocity model may be based on vertical velocities derived from sonic logs and, for example, one or more known-location source shots to orient geophones and calibrate the velocity model for anisotropy.

One type of isotropy is referred to as vertical transverse isotropy (VTI) or transverse isotropy (TI), which includes an axis of rotational symmetry (e.g., vertical or another direction). As an example, for VTI, in layered rocks, properties can be substantially uniform horizontally within a layer, but vary vertically and from layer to layer. Velocity model calibration can aim to account for at least some amount of TI, for example, consider accounting for VTI as may exist in unconventional shales. Another type of TI is horizontal transverse isotropy (HTI). As an example, velocity model calibration may aim to account for at least some amount of HTI where a series of shots are available at variable azimuths.

As an example, for VTI, anisotropy can be modeled by adding Thomsen anisotropy parameters epsilon, delta, and gamma ($\epsilon$, $\delta$ and $\gamma$) until modeled arrival times fit observed arrival times for calibration shots. In such an example, accuracy of the calibrated model may be further verified if the modeled calibration shot locations match their expected locations.

Various parameters may be used to characterize anisotropy, which can include one or more of the Thomsen parameters $\epsilon$, $\delta$ and $\gamma$ (see, e.g., Thomsen, "Weak elastic anisotropy", Geophysics, Vol. 51, No. 10, pp. 1954-1966, October 1986). Compressional velocity variation for an arbitrary direction can be parameterized for direction of wave propagation, for example, as follows:

$$\varepsilon = \frac{C_{11} - C_{33}}{2C_{33}}$$

$$\delta = \frac{(C_{13} + C_{44})^2 - (C_{33} - C_{44})^2}{2C_{33}(C_{33} - C_{44})}$$

$$\gamma = \frac{C_{66} - C_{44}}{2C_{44}}$$

where $C_{ij}$ is the elasticity tensor with respective i and j indexes.

In the Thomsen formulation, velocity Vp can be described along a symmetry axis, $\epsilon$ and $\delta$ and a shear wave can be polarized in a plane normal to the anisotropy symmetry axis (e.g., SH or quasi SH), as described by a direction of wave propagation, while the velocity Vs can be described along the symmetry axis and $\gamma$. A shear wave polarized normal to SH (quasi SV) can be described by Vs along the symmetry axis, ε and δ. By measuring velocities for waves propagating in different directions, it is possible to estimate one or more of the Thomsen parameters.

Figure 7:
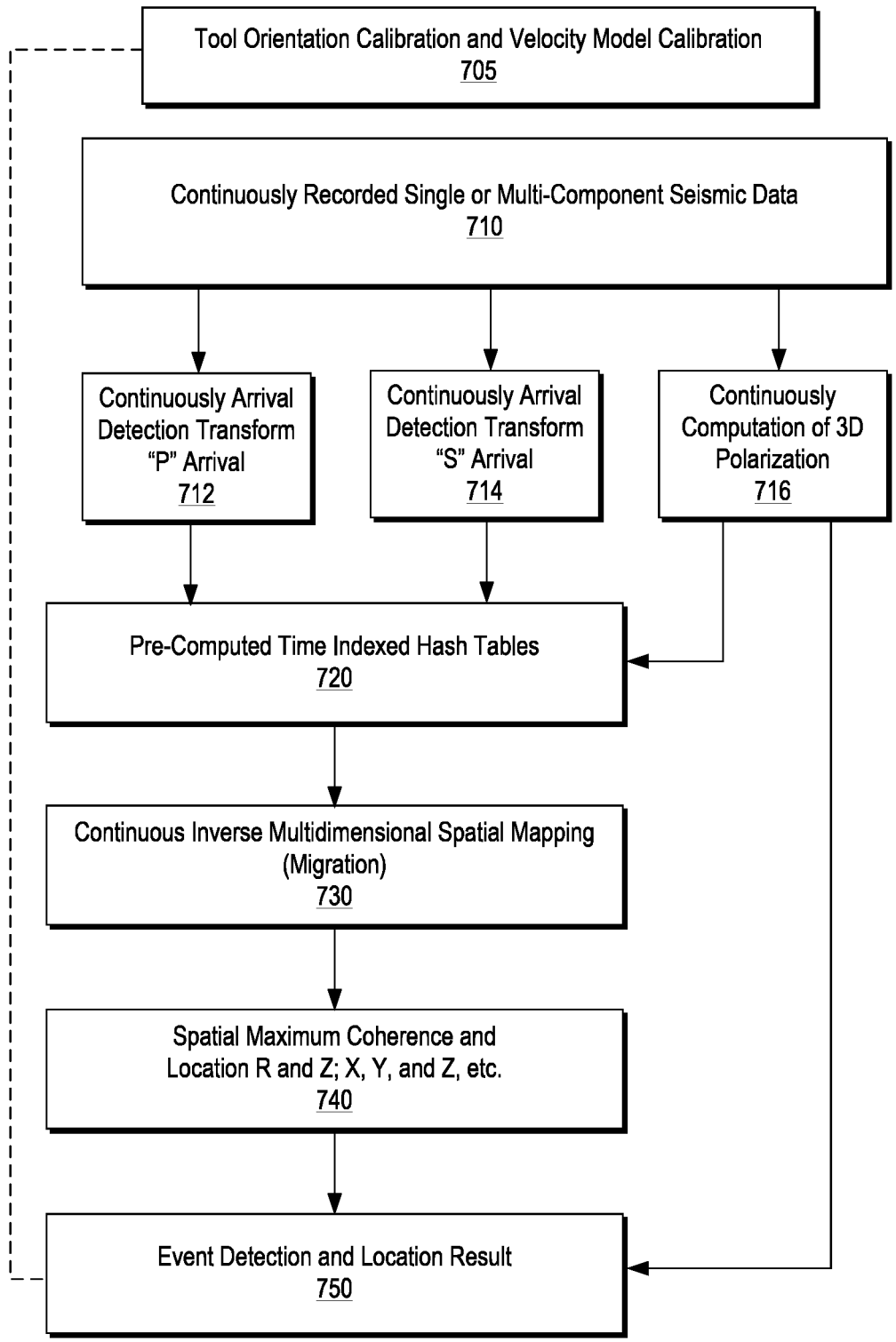
FIG. 7 illustrates an example of a method.
Figure 8:
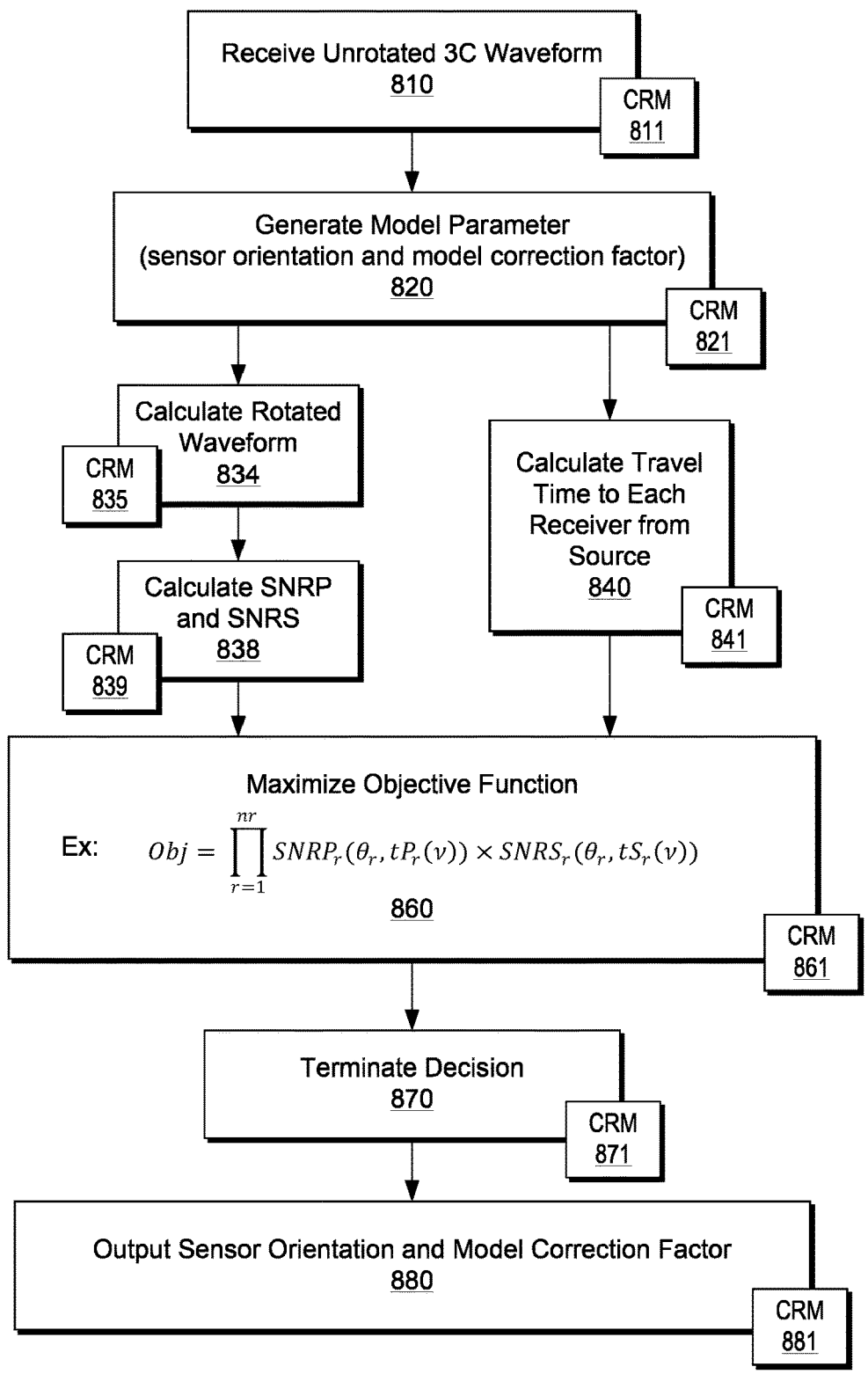
FIG. 8 illustrates an example of a method.

FIG. 7 shows an example of a method 700 for monitoring microseismic events. In the example of FIG. 7, the method 700 can include a tool orientation calibration and velocity model calibration block 705 that can jointly perform such calibrations, which can be utilized, for example, in helping to detect events and determine locations. FIG. 8 shows an example of a method 800, described further below, that may be utilized by the block 705, for example, as to the method 700 and/or one or more other methods that involve microseismic monitoring. The method 700 of FIG. 7 can include various actions, operations, processes, etc., of a coalescence microseismic mapping (CMM or CMMapping) approach, for example, as described in U.S. Pat. No. 7,660,199, issued 9 Feb. 2010, which is incorporated by reference herein. The aforementioned patent and article describe CMM approaches that address event location and origin time determination, which can provide for detection and location of microseismic events in a manner that allows for inclusion of velocity model uncertainty.

In the example of FIG. 7, the method 700 may be performed on continuous data or on a semi-continuous basis, for example, using short time windows of data as indicated per block 710. The method 700 can implement contemplates a sequence of transforms per blocks 712, 714 and 716, which may include continuous arrival detection transforms and/or continuous computation of three-component (3C) polarization. As shown in the example of FIG. 7, pre-computed time indexed hash tables may be utilized, per block 720. As indicated per block 730, mapping or migration can be performed such as, for example, continuous inverse 2D spatial mapping, 3D spatial mapping, 4D spatial mapping (e.g., with three dimensions spatial and one dimension temporal), etc. In such an example, the mapping can output a continuous value representing a maximum coalescence from a spatial map, along with a location of the maximum coalescence, per block 740. As shown in FIG. 7, the time and location of maximum coalescence above a detection threshold can correspond to a measured time and location that an event is reported to have occurred as indicated per block 750.

Continuous arrival detection transform can discount a signature of a recorded seismic signal and enhance arrival detection. Therefore, transform may involve cross correlation and deconvolution (filtering) to enhance or measure a signal with a particular wave shape. Transform may also include arrival detection algorithms or measure of an arrival such as waveform energy or unsigned waveform amplitude. As an example, a detection transform may be a measure of the first arrival signal, as long as the measurement provides substantially the same response for each of the seismic detectors. Obtaining accurate timing of the event benefits from knowledge of how the detection transform relates to the timing of the first arrival.

For a sufficient number of suitably located seismic detectors, a unique location of the microseismic energy may be determined whether the source is identified, modeled, and mapped as strictly a P-wave seismic source, strictly an S-wave seismic source, or a multi-phase seismic source. Uniquely determining a 3D location using the arrival times of a single phase (P or S) involves a minimum measure of four arrival times (e.g., consider GPS positioning as an analogy). Such four measurements can determine four unknowns: time and the three spatial coordinates. As an example, four sensors can be suitably located in space where they do not lie in one plane; however, making an assumption about the location of the source (e.g., fixing that the source was generated on a 2D plane) or fixing the time of the source by another measurement (e.g. electromagnetic timing of an event), the number of seismic detectors to determine a unique location may be reduced to three.

As mentioned, a seismic source may generate P and S seismic energy (P-waves and S-waves). Such information may be used to further constrain mapping and determination of source location. As an example, a smaller number of more simply located seismic detectors may be sufficient to determine a unique location of the source of microseismic energy and map a hydraulic fracture. A single 3C (three-component) or 4C (four-component) detector capable of measuring P-wave polarization (direction of the event) and the P and S arrival time (distance of the event) may determine the location of the event. As an example, through use of a single 3C detector, two possible solutions may be found without making further assumptions about the general direction of the source. As an example, through use of a 4C detector or adding one or more seismic detectors, a single unique location may be determined.

As an example, the method 700 can include utilizing a continuous moving window STA/LTA detection transform, which may be applied to a measured seismic signal for each of a vertical array of a number of 3C seismic detectors such that the transform is sensitive to either a P arrival or an S arrival. A transform may be sensitized to either P or S arrivals by taking an expected P waveform projection and the expected Sh projection for each of the 3C seismic detectors, assuming the source location is in a given general direction. In such an example, detectability of seismic events is enhanced.

In microseismic monitoring workflows, irrespective of acquisition geometry (e.g., downhole, surface, shallow grid, combination thereof, etc.), obtaining accurately mapped hypocentral locations and associated source parameters depends on a calibration process or processes.

As mentioned with respect to the block 705 of FIG. 7, a calibration process can includes tool orientation calibration and velocity model calibration. For example, downhole-based passive microseismic monitoring can include one or more arrays of 3C sensors to be lowered to appropriate distances in one or more monitoring boreholes (e.g., wellbores, etc.) using wireline cables. During such a process, an individual shuttle housing a three-component sensor might rotate. Where a borehole is defined in a cylindrical coordinate system with a longitudinal axis (z), a radial axis (r), and an azimuthal direction ($\Theta$), rotation can be in the azimuthal direction ($\Theta$); noting that the housing may be defined by another cylindrical coordinate system (e.g., $z_h$, $r_h$ and $\Theta_h$). As mentioned, an orientation can account for a direction of gravity (G). As an example, a housing can include a sensor or sensors that are fixed with respect to the housing such that rotation of the housing rotates the sensors. As an example, a sensor may be defined with respect to a housing coordinate system and a housing may be defined as to its position with respect to a borehole coordinate system. During an operation, the position of a housing in a borehole along the longitudinal axis of the borehole may be known with some amount of certainty (e.g., within a distance in meters or less) and, depending on housing features, the radial position of the housing may be known with some amount of certainty (e.g., within a distance of centimeters or less); however, the azimuthal position of the housing, for example, in terms of a 3D coordinate system of the borehole and/or the formation (e.g., the Earth, etc.) may be known with less certainty due to rotation (e.g., in a range from 0 degrees to 360 degrees). Tool orientation (e.g., housing orientation) using one or more sources at known locations helps to properly locate detected microseismic events.

As an example, in a workflow, once a tool string has been oriented, the initial log-derived isotropic velocity model can be calibrated for anisotropy. Though a fully 3D velocity model describing the relevant geology and rock physics can be utilized, another approach involves a velocity model that is 1D or, for example, tilted 1D model. As an example, a method that includes microseismic data acquisition for hydraulic fracturing events may utilize a 1D velocity model, which may be a 1 D tilted velocity model.

As explained above, a method can include tool orientation calibration (e.g., housing orientation calibration) and velocity model calibration (see, e.g., the block 705 of FIG. 7). Such calibrations may be performed sequentially and independently. For example, tool orientation may be addressed first while the velocity model may be addressed second. After performing the two calibrations independently, the method can proceed to event detection and location determinations. Initial observations indicate that hypocenters can vary if the tool orientation calibration is carried out before the velocity model calibration versus the velocity model calibration is performed before the tool orientation.

As to the block 705 of FIG. 7, the tool orientation calibration and velocity model calibration can be performed jointly to increase accuracy of a velocity model and therefore mapped hypocenters and associated source parameters, as well as, for example, turn-around time. A joint calibration process can include measure of uncertainty, which can be employed into further event location and source parameter estimation process. Such a joint calibration method can be utilized with one or more types of multicomponent processing where sensor orientation is to be calibrated, which spans vertical seismic profiling, cross well.

In some workflows, a sensor orientation may be assumed to be straight line as approximate of ray path from source to receiver, and an assumed ray vector may be close to, in terms of polarization direction, and calibrate sensor orientation so that polarization and modeled polarization vector is close. As an example, a joint method may include velocity model calibration that is used to generate synthetic waveform for sensor orientation calibration.

FIG. 8 shows an example of a method 800 that includes a reception block 810 for receiving an unrotated 3D waveform, a generation block 820 for generating a model parameter (e.g., as a sensor orientation and model correction factor), a calculation block 834 for calculating a rotated waveform, a calculation block 838 for calculating SNRP and SNRS, a calculation block 840 for calculating travel time to each receiver from source, a maximization block 860 for maximizing an objective function (e.g., or minimizing an objective function), a termination block 870 for making a termination decision, and an output block 880 for outputting a sensor orientation and a model correction factor.

The method 800 may be associated with various computer-readable storage media (CRM) blocks 811, 821, 835, 839, 841, 861, 871, and 881. Such blocks may include instructions suitable for execution by one or more processors (or processor cores) to instruct a computing device or system to perform one or more actions (e.g., processor-executable instructions). As an example, a single medium may be configured with instructions to allow for, at least in part, performance of various actions of the method 800. As an example, a computer-readable medium (CRM) may be a computer-readable storage medium. A computer-readable storage medium is not a carrier wave, is not a signal and is non-transitory.

In the example of FIG. 8, the method 800 can include computing the objective function from waveforms for 3C sensor orientation for each shuttle (e.g., per 3C receiver) and model calibration parameters (e.g., for transverse isotropic model, 5 parameters: Vp, Vs, and three of the Thomsen parameters ($\varepsilon$, $\delta$ and $\gamma$) (e.g., assuming anisotropy geometry (horizontal or vertical)). As an example, where geometry of anisotropy axis is not assumed then there may be 7 parameters, the former 5 and additionally direction/azimuth and dip. Further, if each layer of a geologic region is considered independently, then the number of parameters to invert for is multiplied by the number of layers.

As to the objective function, it may be selected from various types of functions, which can include CMM-type objective functions and non-linear stack energy functions. However, for full-waveform inversion characterization (e.g., method based on calculation of wavefield), it is possible to leverage residual minimization. However, in such an example, source mechanisms would need to be known, assumed or inverted for. As an example, maximization of an objective function can be performed by one or more of a grid-search, linearized approach, and a stochastic method. As an example, an objective function may be cast as a minimization problem rather than a maximization problem. As an example, an objective function may be utilized to address tool orientation jointly with velocity model calibration.

In the example of FIG. 8, the origin time of an orientation shot can be assumed (see, e.g., CMM approaches, etc.). In the example of FIG. 8, for each of a plurality of iterations, sensor orientation and model perturbation can be generated and an objective function computed using values generated. Iterations can continue until the objective function is converged to a maximum (e.g., as the CMM function, objective function will show maximum when true sensor orientation and model calibration parameter is obtained).

Below is an example objective function that may be utilized in a method such as the example method 800 of FIG. 8:

$$Obj = \prod_{r=1}^{nr} SNRP_r(\theta_r, tP_r(v)) \times SNRS_r(\theta_r, tS_r(v))$$

where SNR represents signal-to-noise ratio, P represents P-wave signal, S represents S-wave signal, r represents receiver (sensor), n represents number of receivers, t represents time, $\theta$ represents orientation, and v represents velocity.

Figure 9:
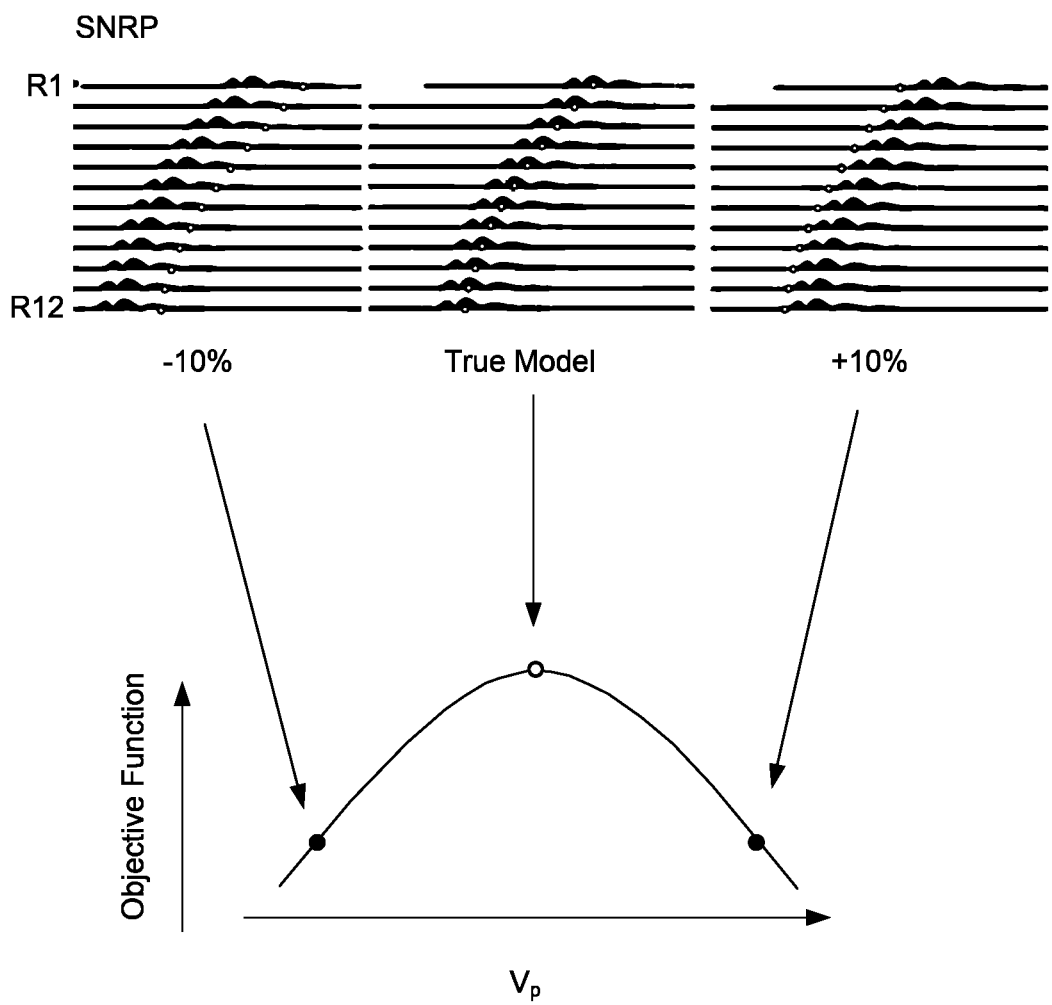
FIG. 9 illustrates examples of graphics associated with joint calibration of orientation and velocity model as in the method of FIG. 8.

FIG. 9 shows an example of a graphical representation 900 of a portion of the method 800 of FIG. 8 where 12 receivers (12 sensors) are utilized, as numbered R1 to R12, where P-wave signal-to-noise ratio (SNRP) is illustrated with respect to time for each of the 12 receivers and where open circles represent model times of P-waves. FIG. 9 includes a plot of objective function versus Vp where the maximum value (open circle) represents the "true" velocity model, whereas, values for −10% and +10% are also shown as being suboptimal. Note that the open circles in the SNRP plots match the signal P-wave versus time in the "true" model for the maximized objective function.

In the example method 800, a velocity model may be more accurate where some amount of "mis-orientation"

occurs for one or more sensors as mis-orientation can drive, computationally, a joint answer that improves accuracy of a velocity model. As an example, a velocity model calibration determined jointly with tool orientation may be performed more rapidly than a velocity model calibration that is not performed jointly.

As an example, a method may be concerned with horizontal shear in an environment with approximately 10 to 30 sensors. In such an example, one or more layers may be considered. As an example, a velocity model may be a 1D model, which as mentioned, may be a 1D tilted model.

Figure 10:
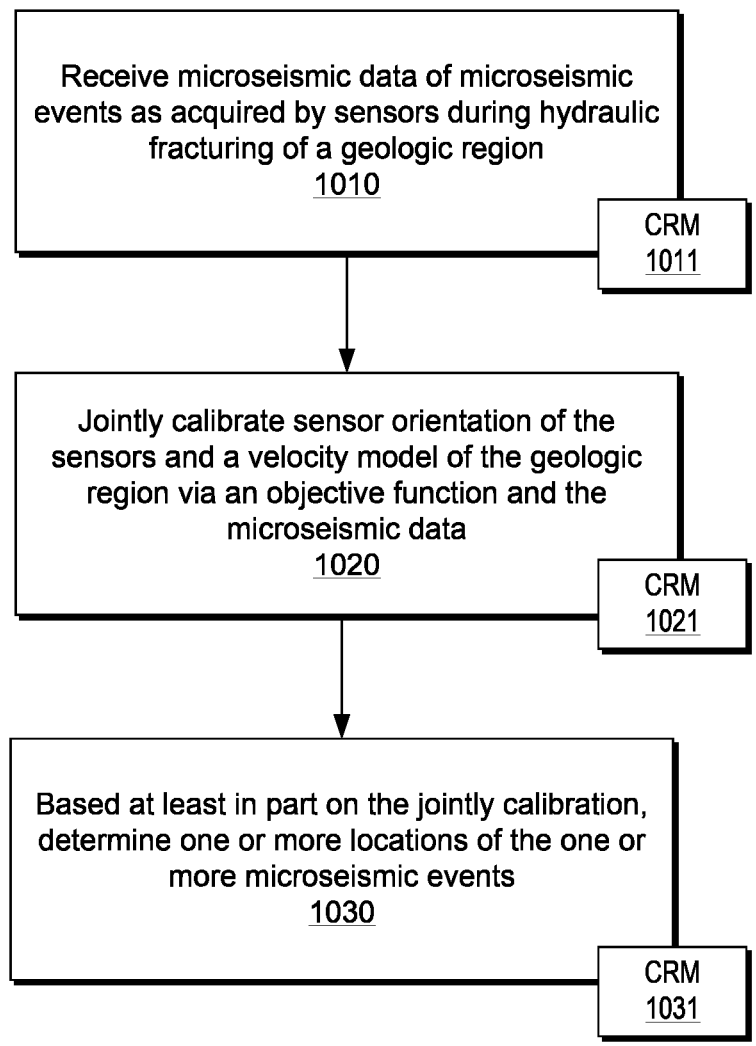
FIG. 10 illustrates an example of a method.

FIG. 10 shows an example of a method 1000 that includes a reception block 1010 for receiving microseismic data of microseismic events as acquired by sensors during hydraulic fracturing of a geologic region; a joint calibration block 1020 for jointly calibrating sensor orientation of the sensors and a velocity model of the geologic region via an objective function and the microseismic data; and a determination block 1030 for, based at least in part on the jointly calibrating, determining one or more locations of the one or more microseismic events. The method 1000 may be utilized in a workflow that includes imaging, control, or one or more other types of operations. As an example, the method 1000 can include rendering a graphic to a display where the graphic includes a marker for at least one of the one or more locations. In such an example, a graphic may be rendered for a fracture that may be based at least in part on at least one of the one or more locations. Such a graphic may be rendered using a multidimensional coordinate system of a subsurface region and may optionally be animated such that a time series of locations can be rendered. Such a time series of locations may provide temporal information for an operator that can determine how a fracture is "growing" in space. Such an animation may be in a real-time or an adjusted time (e.g., compressed, extended, normalized, etc.). As an example, a method can include rendering a location along with additional information such as, for example, magnitude. For example, magnitude may be represented by color, size, etc.

The method 1000 may be associated with various computer-readable storage media (CRM) blocks 1011, 1021 and 1031. Such blocks may include instructions suitable for execution by one or more processors (or processor cores) to instruct a computing device or system to perform one or more actions (e.g., processor-executable instructions). As an example, a single medium may be configured with instructions to allow for, at least in part, performance of various actions of the method 1000. As an example, a computer-readable medium (CRM) may be a computer-readable storage medium. A computer-readable storage medium is not a carrier wave, is not a signal and is non-transitory.

As an example, the method 1000 of FIG. 10 may be utilized in the method 200 of FIG. 2. For example, consider the determination block 266 of the microseismic acquisition workflow 260 of the method 200 where one or more event locations may be determined for one or more microseismic events.

As an example, a method can include receiving microseismic data of microseismic events as acquired by sensors during hydraulic fracturing of a geologic region; jointly calibrating sensor orientation of the sensors and a velocity model of the geologic region via an objective function and the microseismic data; and, based at least in part on the jointly calibrating, determining one or more locations of the one or more microseismic events. In such an example, the one or more locations can correspond to a fracture generated by the hydraulic fracturing.

As an example, an objective function can include at least one signal-to-noise ratio (SNR) term. For example, an objective function can include a P-wave SNR term (SNRP) and an S-wave SNR term (SNRS). As an example, an objective function can be or include a coalescence microseismic mapping objective function.

As an example, a velocity model can be a 1D velocity model. As an example, a velocity model can be a multidimensional velocity model.

As an example, a method can include performing a hydraulic fracturing operation based at least in part on the one or more locations. For example, consider performing based on one or more parameters that account for at least one of the locations, which may act to steer or otherwise direct a fracture in a particular direction (e.g., to facilitate drainage of one or more fluids from a reservoir).

As an example, a method can include, based at least in part on one or more locations, determining whether a fracture generated by hydraulic fracturing conforms to a planned fracture.

As an example, a method can include, based at least in part on jointly calibrating, adjusting an orientation of at least one of the sensors. For example, consider issuing one or more signals to one or more pieces of field equipment that can adjust the orientation of at least one sensor, which can be, for example, disposed in a downhole environment (e.g., a borehole such as a monitoring well).

As an example, sensors can include one or more three-component seismic sensors. As an example, such sensors can be carried by a sensing unit (e.g., a sensing body). As an example, a field operation can include deploying sensors and, for example, actuating one or more biasing mechanisms (e.g., springs, etc.) that bias one or more portions of a sensing unit (e.g., a sensing body) in a borehole to stabilize its position.

As an example, a borehole can have a borehole coordinate system where a sensor can have a corresponding housing that has a housing coordinate system where sensor orientation is defined with respect to the borehole coordinate system and the housing coordinate system. As an example, a coordinate system may be defined in part by and/or reference a direction of gravity (Earth's gravity).

As an example, a system can include a processor; memory accessible by the processor; processor-executable instructions stored in the memory that include instructions to instruct the system to: receive microseismic data of microseismic events as acquired by sensors during hydraulic fracturing of a geologic region; jointly calibrate sensor orientation of the sensors and a velocity model of the geologic region via an objective function and the microseismic data; and, based at least in part on the jointly calibration, determine one or more locations of the one or more microseismic events. In such an example, the one or more locations can correspond to a fracture generated by the hydraulic fracturing.

As an example, an objective function can include at least one signal-to-noise ratio (SNR) term. For example, consider an objective function that includes a P-wave SNR term (SNRP) and an S-wave SNR term (SNRS). As an example, an objective function can include a coalescence microseismic mapping objective function.

As an example, a velocity model can be a 1D velocity model or, for example, a multidimensional velocity model.

As an example, one or more computer-readable storage media can include computer-executable instructions to instruct a system to: receive microseismic data of microseismic events as acquired by sensors during hydraulic fracturing of a geologic region; jointly calibrate sensor orientation of the sensors and a velocity model of the geologic region via an objective function and the microseismic data; and, based at least in part on the jointly calibration, determine one or more locations of the one or more microseismic events. In such an example, the objective function can include a P-wave SNR term (SNRP) and an S-wave SNR term (SNRS).

As an example, a workflow may utilize output from a joint calibration of sensor orientation and velocity model for one or more purposes. As an example, a workflow can include one or more of improving accuracy of determinations as to locations of one or more microseismic events (e.g., hypocenter determination, etc.), reducing uncertainty as to location of a microseismic event, improving accuracy as to a fracture's location and/or extent, reducing uncertainty as to a fracture's location and/or extent, improving accuracy of a drainage estimation from a drainage area that includes one or more generated fractures, reducing uncertainty as to a drainage estimation from a drainage area that includes one or more generated fractures, improving detecting of one or more geohazards, improving control of placement of one or more sensors, etc.

As an example, the output of a joint calibration of sensor orientation and velocity model may be utilized to determine at least a location of an event (e.g., a microseismic event). As an example, a method may include determining a time and a location of an event. As an example, a method may implement CMM, Geiger's method, and/or one or more other techniques to provide location and/or time information as to one or more events. In terminology utilized for earthquakes, a hypocenter is the position where the strain energy stored in the rock is first released, marking the point where a fault begins to rupture, which occurs directly beneath the epicenter, at a distance known as the focal or hypocentral depth. One or more of such parameters may be determined for one or more microseismic events generated during (e.g., or after) a hydraulic fracturing operation where, rather than a fault, a fracture is generated or reactivated (e.g., consider an existing fracturing being reactivated such that it can suitably conduct fluid). Depending on development of a reservoir, reactivation of an existing fracture (e.g., a natural fracture) may be favorable or unfavorable. Information as to such reactivation may be utilized in controlling one or more subsequent actions and/or, if available in real-time, it may be utilized in controlling an ongoing action (e.g., within a stage of a multistage operation, etc.).

As an example, information from a joint calibration can be utilized to more accurately locate one or more portions of a well from which one or more hydraulic fracturing operations may be performed (e.g., perforation, injection, etc.). As an example, accuracy of a well landing may be improved.

As an example, information from a joint calibration can be utilized to supplement an interpretation that is based at least in part on previously acquired seismic data. For example, microseismic data may be processed with calibrated sensor orientation and/or calibrated velocity model information from a joint calibration to improve a prior interpretation (e.g., per the PETREL framework, etc.).

As an example, information from a joint calibration may be utilized to monitor one or more actions that occur during a hydraulic fracturing operation (e.g., perforation, injection, etc.).

As an example, information from a joint calibration may be utilized in determining one or more moment tensors. A moment tensor can be a physics-based mathematical representation of the movement of rock during an event, which can include nine generalized couples, or nine sets of two vectors. Such a tensor can depend on source strength and fracture orientation.

As an example, a system may include instructions, which may be provided to analyze data, control a process, perform a task, perform a workstep, perform a workflow, etc.

Figure 11:
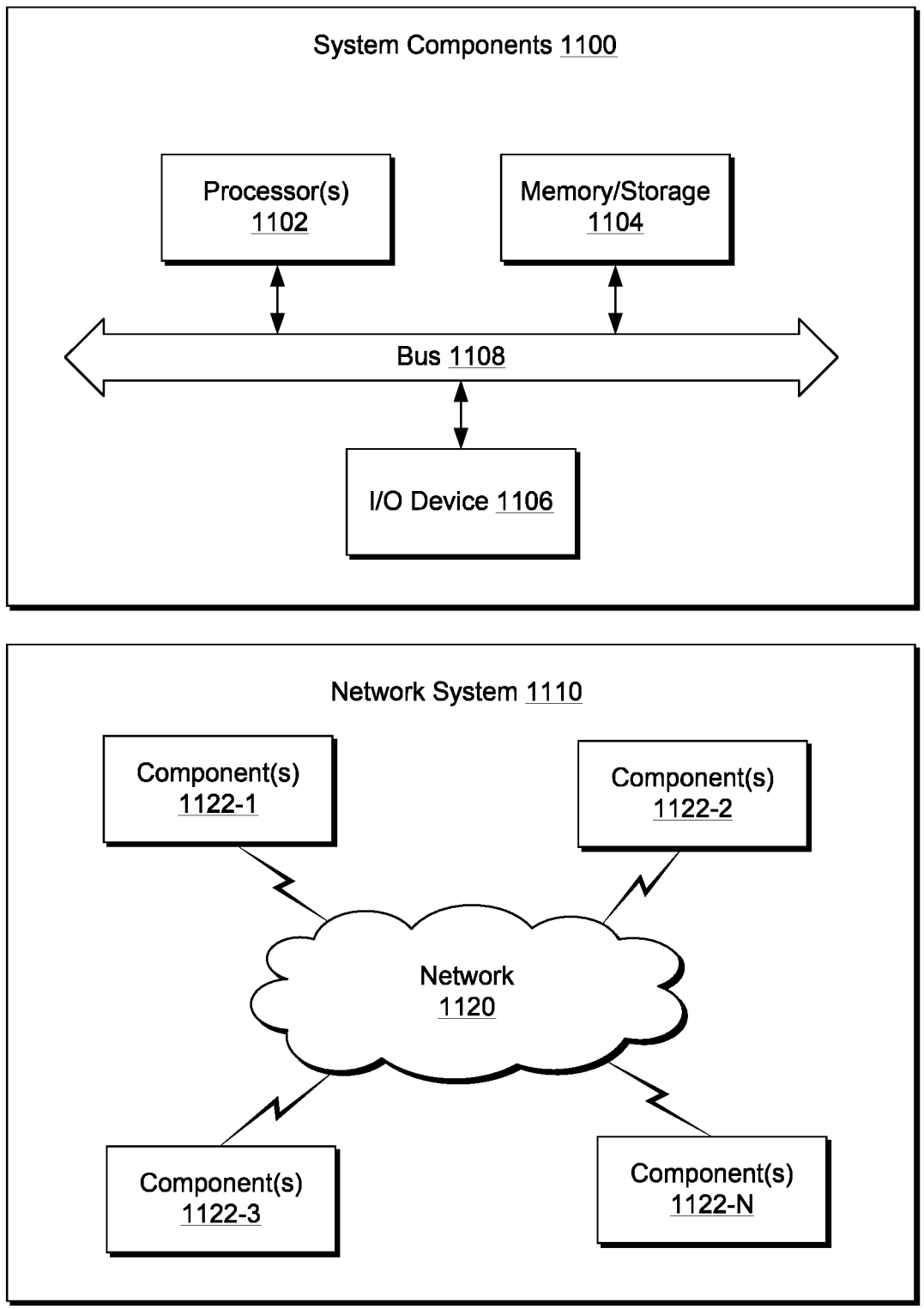
FIG. 11 illustrates example components of a system and a networked system.

FIG. 11 shows components of an example of a computing system 1100 and an example of a networked system 1110. The system 1100 includes one or more processors 1102, memory and/or storage components 1104, one or more input and/or output devices 1106 and a bus 1108. In an example embodiment, instructions may be stored in one or more computer-readable media (e.g., memory/storage components 1104). Such instructions may be read by one or more processors (e.g., the processor(s) 1102) via a communication bus (e.g., the bus 1108), which may be wired or wireless. The one or more processors may execute such instructions to implement (wholly or in part) one or more attributes (e.g., as part of a method). A user may view output from and interact with a process via an I/O device (e.g., the device 1106). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1110. The network system 1110 includes components 1122-1, 1122-2, 1122-3, . . . 1122-N. For example, the components 1122-1 may include the processor(s) 1102 while the component(s) 1122-3 may include memory accessible by the processor(s) 1102. Further, the component(s) 1122-2 may include an I/O device for display and optionally interaction with a method. The network 1120 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method (1000) comprising:
   receiving microseismic data of microseismic events as acquired by sensors during hydraulic fracturing of a geologic region (1010);
   jointly calibrating sensor orientation of the sensors and a velocity model of the geologic region via an objective function and the microseismic data (1020), and adjusting an orientation of at least one of the sensors based at least in part on the jointly calibrating; and
   based at least in part on the jointly calibrating, determining one or more locations of the one or more microseismic events (1030).

2. The method of claim 1 wherein the one or more locations correspond to a fracture generated by the hydraulic fracturing.

3. The method of claim 1 wherein the objective function comprises at least one signal-to-noise ratio (SNR) term selected from a P-wave SNR term (SNRP) and an S-wave SNR term (SNRS).

4. The method of claim 1 wherein the objective function comprises a coalescence microseismic mapping objective function.

5. The method of claim 1 wherein the velocity model is a 1D velocity model.

6. The method of claim 1 comprising, based at least in part on the one or more locations, determining whether a fracture generated by the hydraulic fracturing conforms to a planned fracture.

7. The method of claim 1 wherein the sensors comprise three-component seismic sensors.

8. The method of claim 1 wherein the sensors comprise sensors disposed in one or more boreholes, wherein a borehole of the one or more boreholes comprises a borehole coordinate system and wherein a sensor of the sensors comprises a corresponding housing that comprises a housing coordinate system wherein sensor orientation is defined with respect to the borehole coordinate system and the housing coordinate system.

9. One or more computer-readable storage media comprising computer-executable instructions to instruct a system to perform a method according to any of claims 1 to 8.

10. A system (1100) comprising:
    a processor (1102);
    memory (1104) accessible by the processor;
    processor-executable instructions stored in the memory that comprise instructions to instruct the system to:
      receive microseismic data of microseismic events as acquired by sensors during hydraulic fracturing of a geologic region (1011);
      jointly calibrate sensor orientation of the sensors and a velocity model of the geologic region via an objective function and the microseismic data (1021)), and adjust an orientation of at least one of the sensors based at least in part on the jointly calibrating; and
      based at least in part on the jointly calibration, determine one or more locations of the one or more microseismic events (1031).

11. The system of claim 10 wherein the one or more locations correspond to a fracture generated by the hydraulic fracturing.

12. The system of claim 10 wherein the objective function comprises at least one signal-to-noise ratio (SNR) term.

13. The system of claim 10 wherein the objective function comprises a coalescence microseismic mapping objective function.

14. The system of claim 10 wherein the velocity model is a 1D velocity model.

* * * * *